March 14, 1961  H. W. COLE, JR  2,974,525
FLOWMETER WITH SPECIFIC GRAVITY COMPENSATOR
Filed Sept. 8, 1953  8 Sheets-Sheet 1

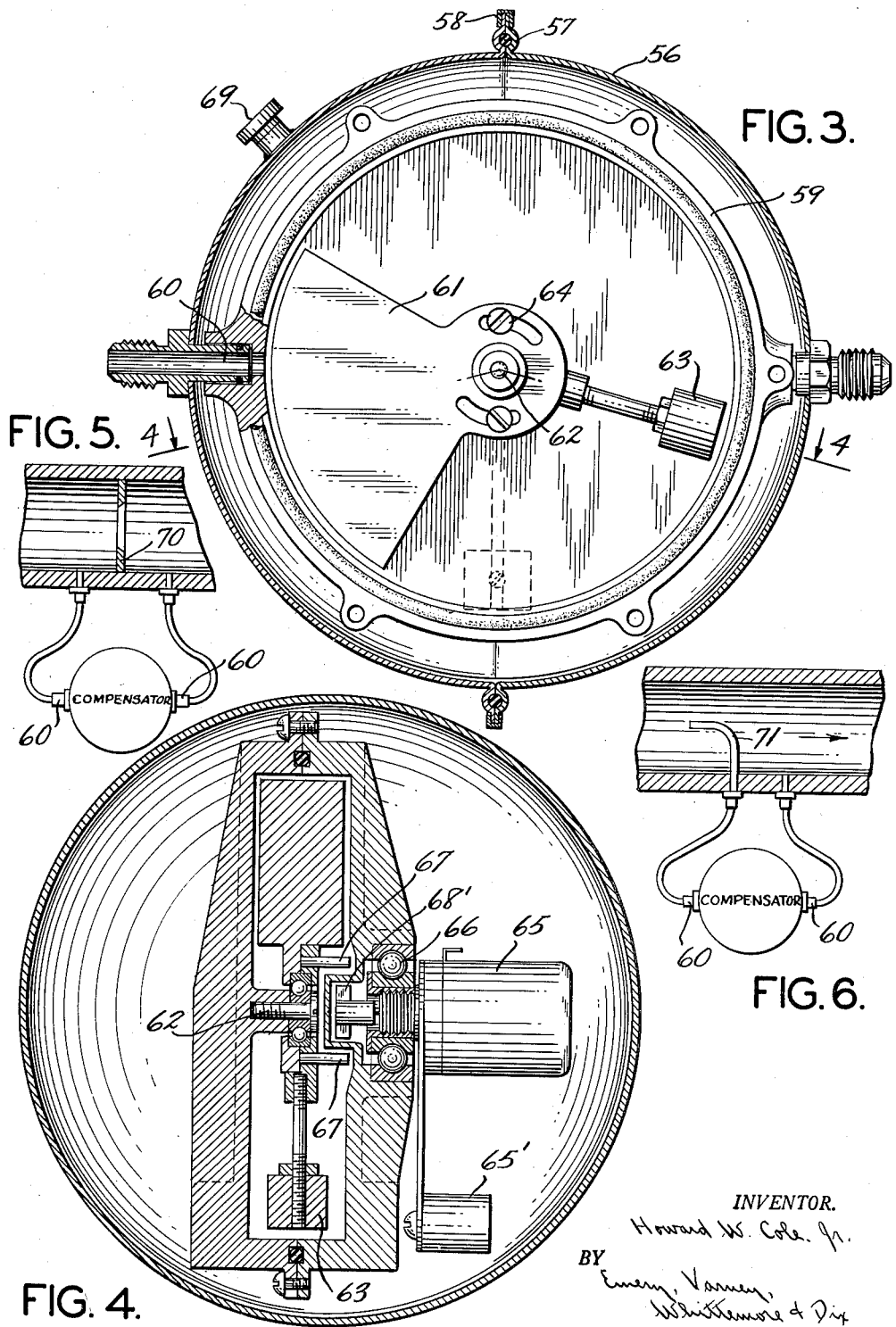

INVENTOR.
Howard W. Cole, Jr.
BY Emery, Varney,
Whittemore & Dix
ATTORNEYS.

March 14, 1961  H. W. COLE, JR  2,974,525
FLOWMETER WITH SPECIFIC GRAVITY COMPENSATOR
Filed Sept. 8, 1953   8 Sheets-Sheet 4

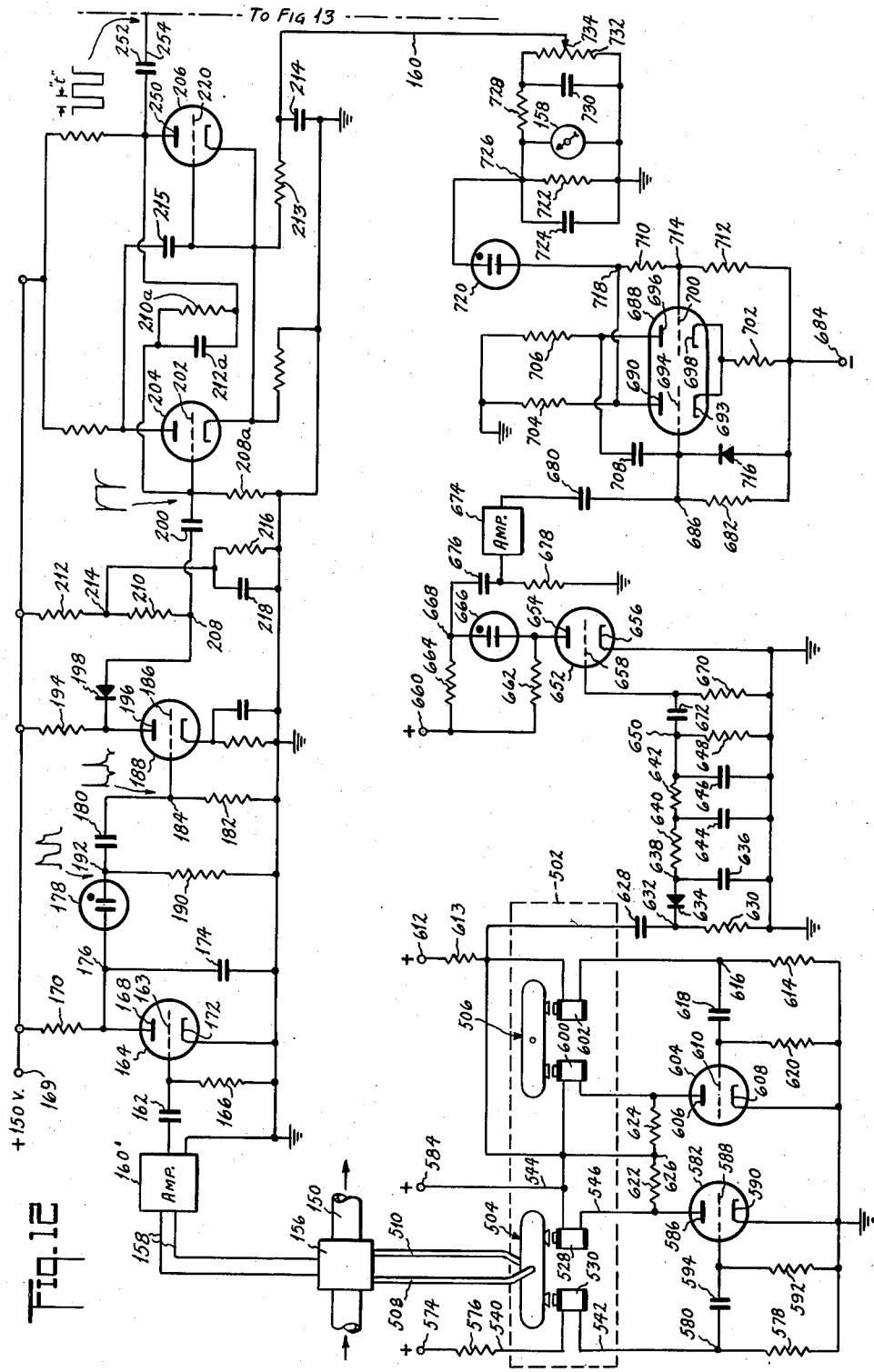

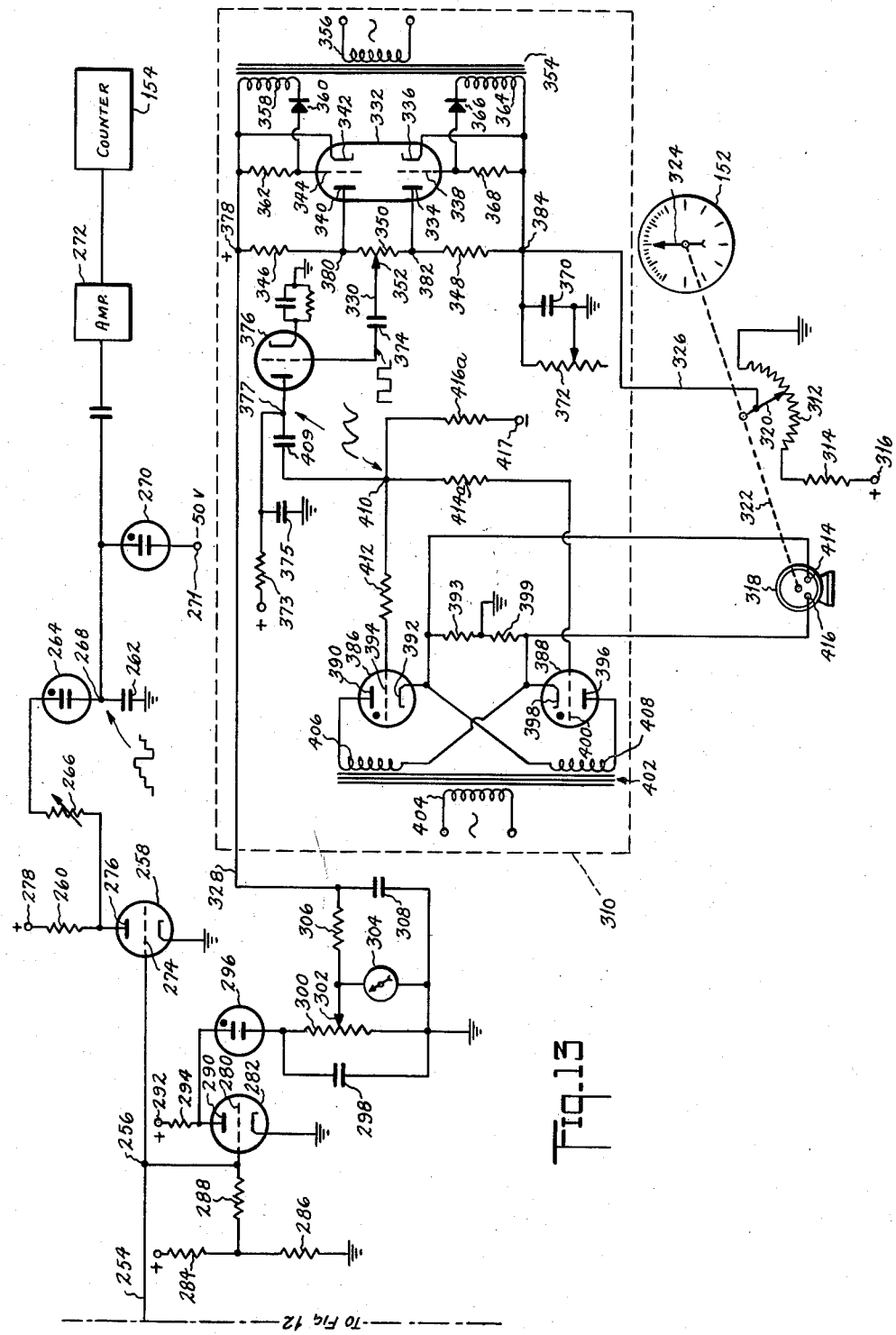

March 14, 1961 H. W. COLE, JR 2,974,525
FLOWMETER WITH SPECIFIC GRAVITY COMPENSATOR
Filed Sept. 8, 1953 8 Sheets-Sheet 7
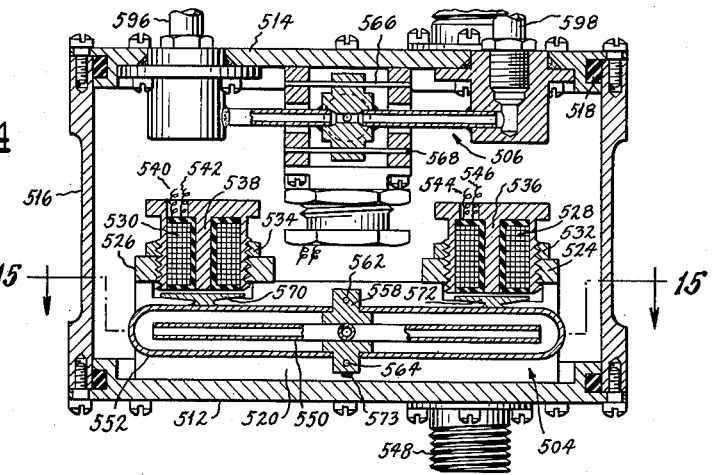
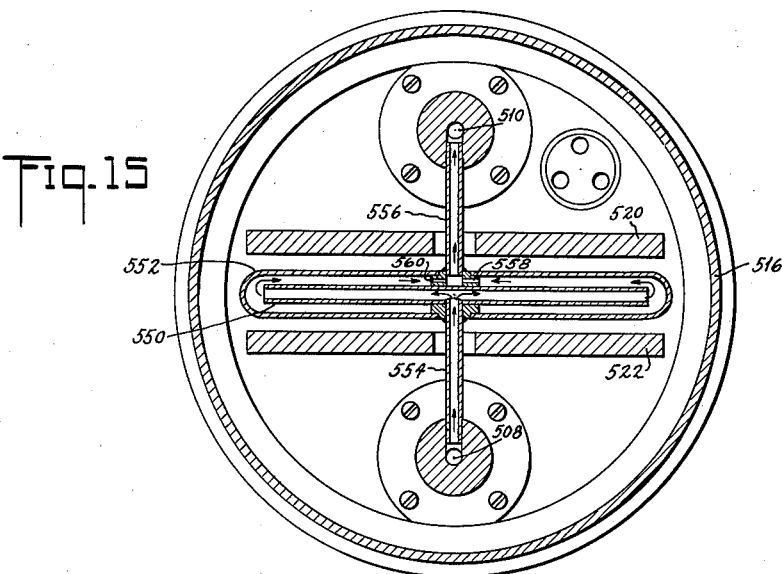
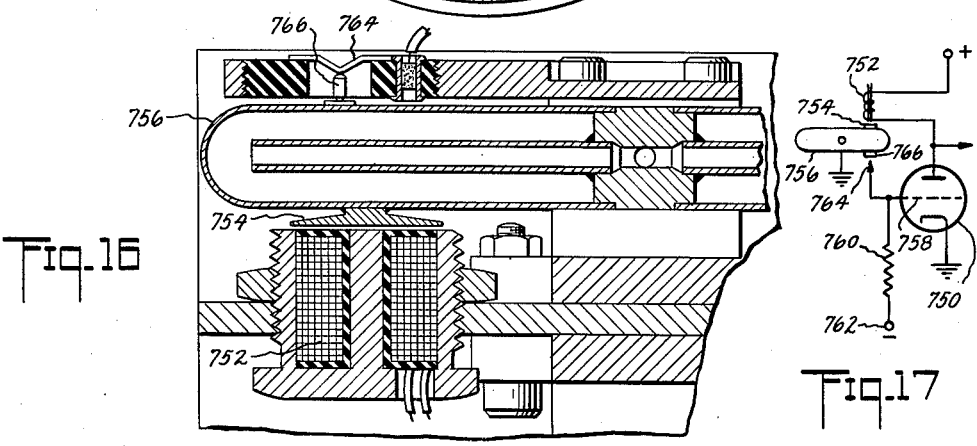

March 14, 1961  H. W. COLE, JR  2,974,525
FLOWMETER WITH SPECIFIC GRAVITY COMPENSATOR
Filed Sept. 8, 1953
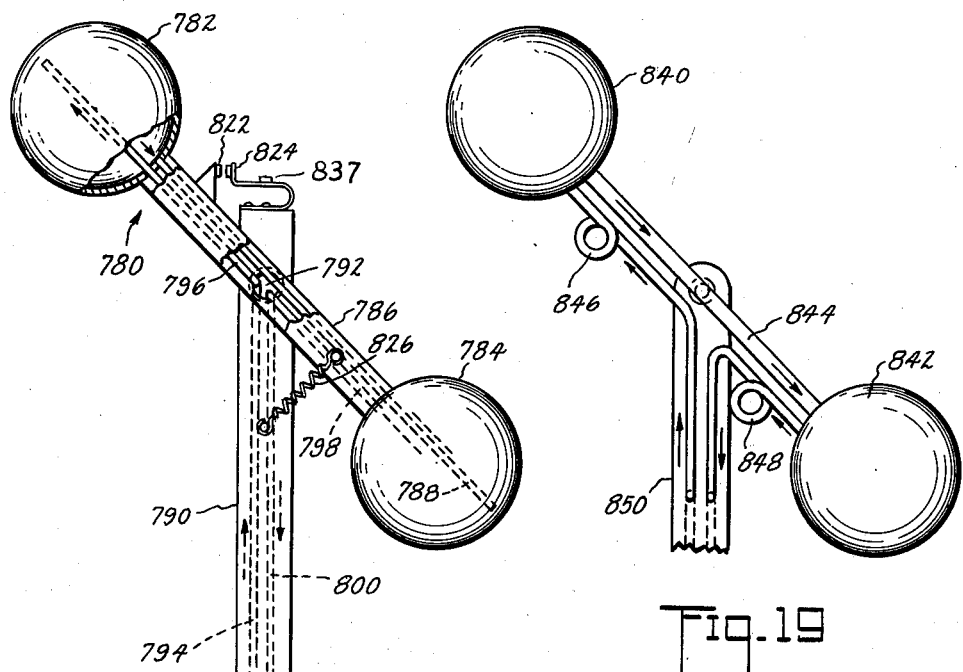
Fig. 19
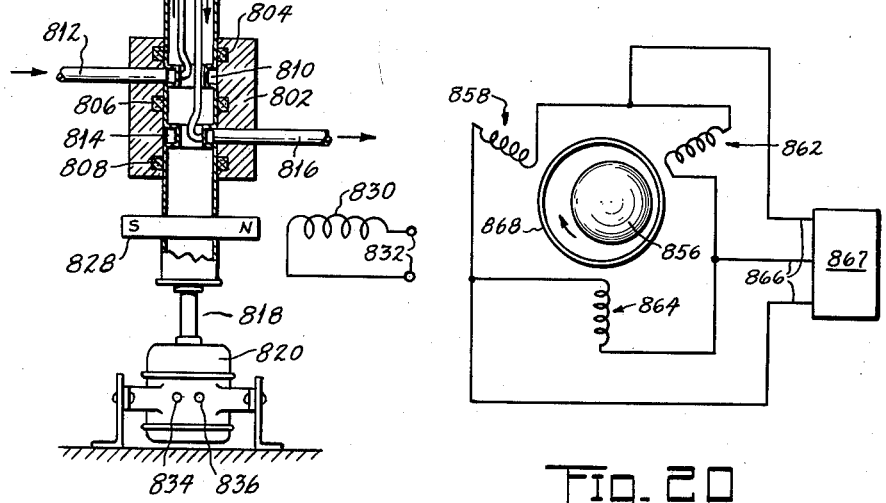
Fig. 18
Fig. 20

United States Patent Office 2,974,525
Patented Mar. 14, 1961

2,974,525

FLOWMETER WITH SPECIFIC GRAVITY COMPENSATOR

Howard W. Cole, Jr., 12 Vale Drive, Mountain Lakes, N.J.

Filed Sept. 8, 1953, Ser. No. 378,760

10 Claims. (Cl. 73—231)

This application is a continuation-in-part of application Serial No. 241,854, filed August 14, 1951, now Patent No. 2,683,224.

This invention relates to measuring apparatus, particularly for measuring specific gravity, fluid flow in volumetric or gravimetric units, and the velocity of fluid flow. There are described herein systems for measuring quantities of the type mentioned above, and also subcombinations of components which are useful per se as well as in such systems.

Thus one object of the invention is to provide a density-compensated system and method for measuring fluid flow in gravimetric units with a high degree of precision, and another object of the invention is to provide apparatus for precisely measuring specific gravity of fluids and other materials. The novel specific-gravity-measuring apparatus to be described herein is useful per se, and also may, with unique advantages, act as the density-compensating component of the aforementioned system.

It will be understood herein that the term "fluid" is intended to be broad enough to include liquids, gases, material which is partly liquid and partly gaseous, material which is flowable although including small solid or semi-solid particles, or various combinations of the same.

The apparatus uses, as a flow- or velocity-sensing device, a small axially mounted, bladed rotor installed in the fluid system so that the fluid to be measured causes the rotor to revolve. Rotation of the rotor produces a definite, predetermined number of electrical pulses for each revolution. Thus the electrical output contains both rate information (output frequency) and total flow information (total number of pulses). The electrical output is a linear function of the velocity of movement of the fluid. The rotor may be mounted in a conduit through which the fluid flows, in which case the electrical output is a linear function of the volumetric flow since the rotational speed of the rotor is determined only by the effective blade angle and the effective cross-sectional area of the flow passage at the blade location.

As a variation, the rotor may be mounted in a location other than in a conduit, for example, it may be used as an air speed indicator for aircraft, or it may be used in such applications as to a ship's log.

There are described herein several embodiments of apparatus for measuring the specific gravity or density of fluids or other material. A feature of certain of these embodiments is that they do not depend upon the force of gravity, and their accuracy is not affected by any variations in the value of gravitational force or other accelerating forces to which the apparatus may be subjected. This feature is particularly advantageous when the apparatus is being used in aircraft, which may subject it to strong accelerations during the measurements, without affecting its performance. Certain embodiments of the specific gravity or density measuring apparatus include the use of a hollow body, for example, a tube, or a tube having hollow balls on its ends, for containing the material to be tested. The hollow body is mounted for variable positioning, or in some embodiments oscillation, about a transverse axis. An important feature is that the body is balanced about this axis so that the pull of gravity or the force of accelerations of the entire mechanism in any direction will not affect the position or movement of the hollow body with respect to the axis. In one arrangement, the hollow body is caused to oscillate about this axis, with the aid of an intermittent driving force and a restoring force, and the frequency of oscillation will depend upon and be an indication of the specific gravity of the material in the hollow body. Electronic apparatus is provided for generating a unidirectional voltage proportional to the frequency of oscillation. This voltage may be applied to an indicating voltmeter calibrated to read specific gravity or density, or instead this voltage may be used to provide density compensation of the flow measuring system.

In another embodiment of the specific gravity measuring apparatus, instead of oscillating a hollow body filled with the fluid to be tested, such a body, or a portion of it, is rotated or given an orbital motion so as to produce a centrifugal force effect related to the specific gravity of the material in the hollow body, and this centrifugal force effect is measured. In one arrangement, the hollow body is suspended in such a way that spring means exert a force opposed to the centrifugal force. Heavier fluids will produce a given outward displacement against the action of the spring means at a lower speed of rotation, while lighter fluids will require a higher speed of rotation to produce the same outward displacement. The apparatus is arranged so that the speed of rotation will automatically rise until a given outward displacement occurs. Hence a measurement of the speed of rotation at which equilibrium is established will be indicative of the specific gravity of the fluid.

In still another variation of the specific gravity measuring apparatus, there is employed a mechanical arrangement including a relatively large, light body, and a relatively small, dense counterweight, rigidly connected together, suspended from and extending out in more or less opposed positions from an axis on which they may shift position. The body and the counterweight are submerged in the fluid to be tested, and variations in the specific gravity of the fluid will vary their position. A spring is employed in one arrangement in order to improve the linearity of the output and in order to cause the position of the light body and counterweight to be a function of buoyancy only.

In one system for measuring fluid flow in gravimetric units, there is provided a pulse generator of a type adapted to generate a substantially square pulse in response to the application of a triggering pulse to the pulse generator, the square pulse being of variable width. The width of the pulse, in one arrangement, depends on the setting of a variable resistor in the pulse generator, and in another arrangement depends upon the value of a unidirectional voltage applied to the pulse generator. The specific gravity measuring apparatus is adapted to vary the resistor, or control the unidirectional voltage, for determining the width of the square pulse. The flow sensing unit, which generates voltage pulses at a rate determined by the rate of fluid flow, applies its voltage pulses to the pulse generator, for determining the repetition rate of the square pulses. There is, therefore, derived from the pulse generator a series of square pulses, the repetition rate of which is determined by the volumetric rate of flow of the fluid, and the duration of which is determined by the density of the fluid. For indicating the gravimetric rate of flow, the variable width square pulses are used to apply current pulses of like shape to charge a condenser shunted by a resistor; and indicating apparatus, for example, a suitably calibrated voltmeter, or a servo driving an indicating pointer, is connected and adapted to provide an indication proportional to the average voltage of the condenser. This indication will read the rate of flow in gravimetric units. For providing an indication of the total flow in gravimetric units, there is provided apparatus adapted to cause a counter to indicate a value determined by the integrated value of the variable width pulses. For this purpose, the pulses are caused to charge a condenser through a first cold-cathode gas tube, and when the condenser is charged to a value determined by the firing voltage of a second cold-cathode gas tube, the condenser discharges through the second gas tube, actuating the counter. The total number of counts indicated by the counter will represent the total flow in gravimetric units.

Further objects, features, advantages and embodiments of the invention will appear from the more detailed description set forth by way of illustration, which will now be given in conjunction with the accompanying drawings, in which:

Fig. 3 is a sectional view showing one embodiment of apparatus for measuring the density or specific gravity of the fluid. This apparatus may be used in a flow measuring system to compensate for variations in the density of the fluid.

Fig. 4 is a sectional view taken along the line 4—4 of Fig. 3 but with a portion of the apparatus in vertical elevation.

Fig. 5 is a diagrammatic view showing a way in which the density compensator of Figs. 3 and 4 may be connected in the pipe line.

Fig. 6 is a view similar to Fig. 5 but showing a modified construction.

Figure 1:
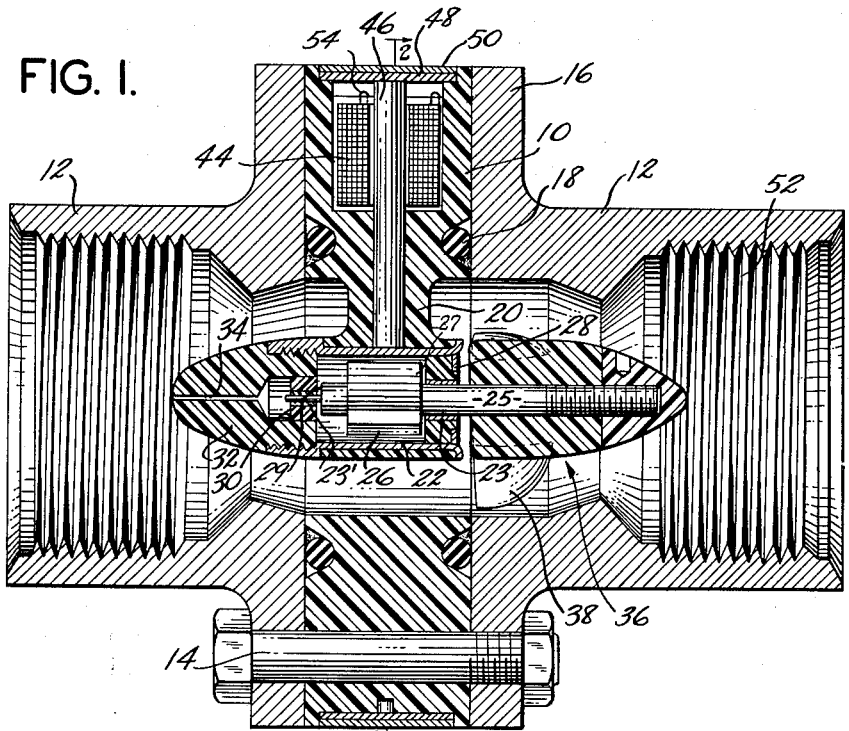
Fig. 1 is a longitudinal sectional view, on the line 1—1 of Fig. 2, through a flow sensing unit, for sensing the flow of a fluid.
Figure 2:
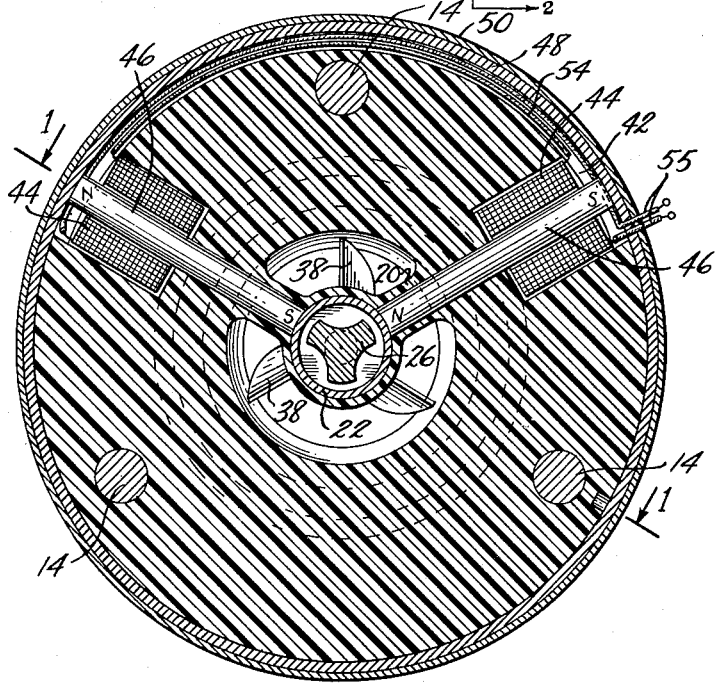
Fig. 2 is a cross sectional view taken on the line 2—2 of Fig. 1.
Figure 7:
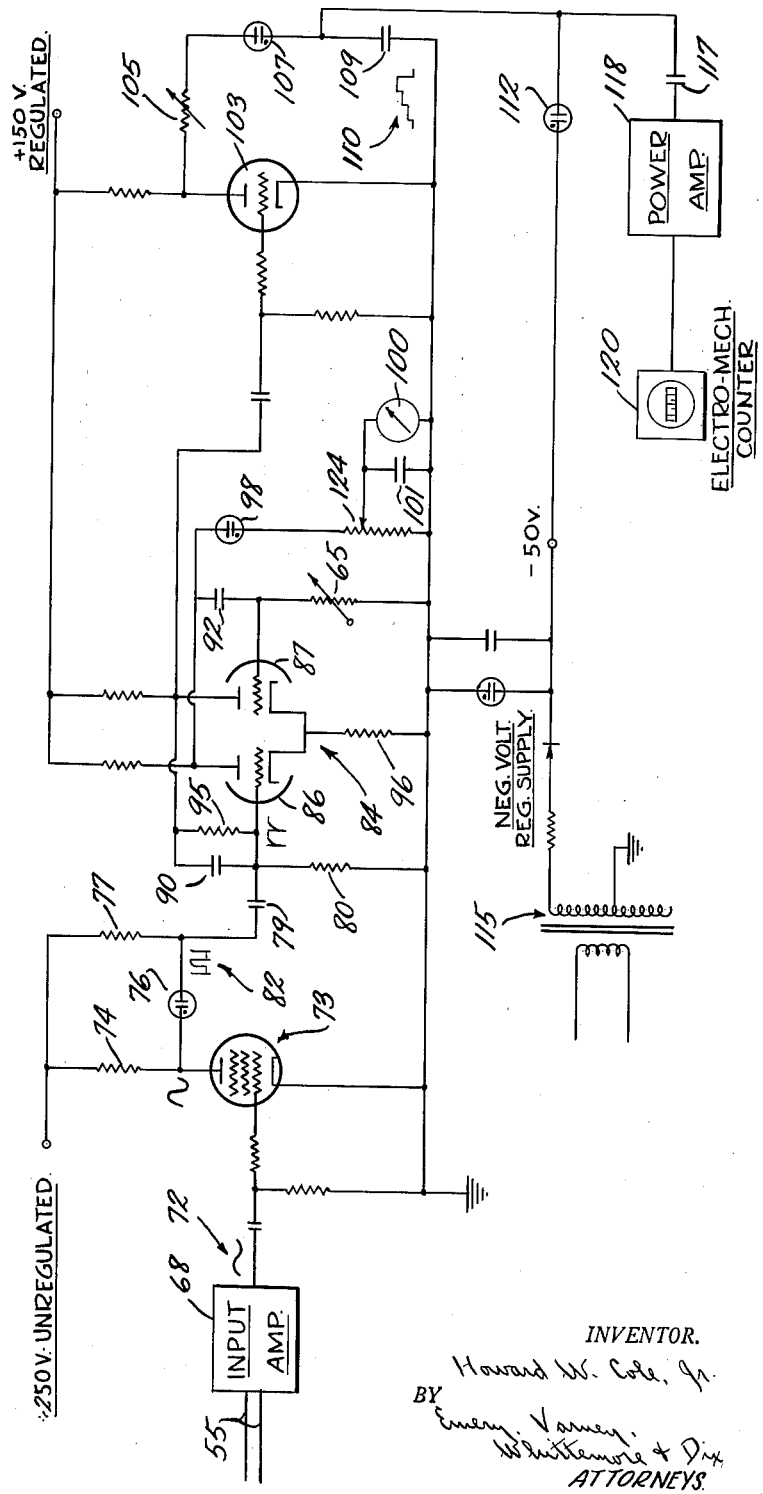

Fig. 7 is a diagrammatic view, mostly a wiring diagram, of the apparatus for indicating and totaling the flow that passes through the flow sensing unit shown in Figs. 1 and 2. The system of Fig. 7 receives an input voltage from the flow sensing unit of Figs. 1 and 2 and is also controlled by the density compensator of Figs. 3 and 4, which varies the potentiometer 65.

Figure 8:
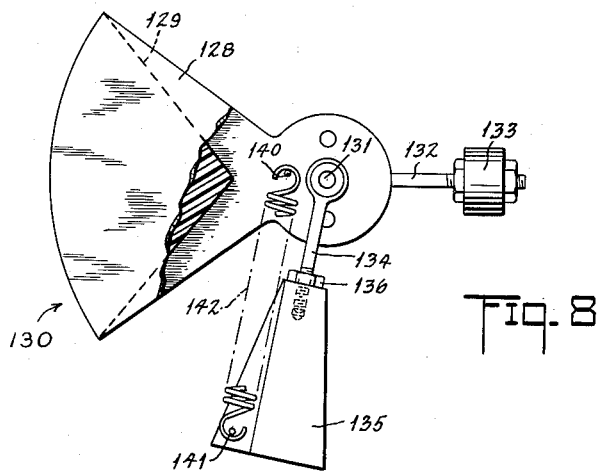

Fig. 8 is a view, chiefly in elevation, showing a modification of the apparatus of Figs. 3 and 4 for measuring the specific gravity of the fluid.

Figure 9:
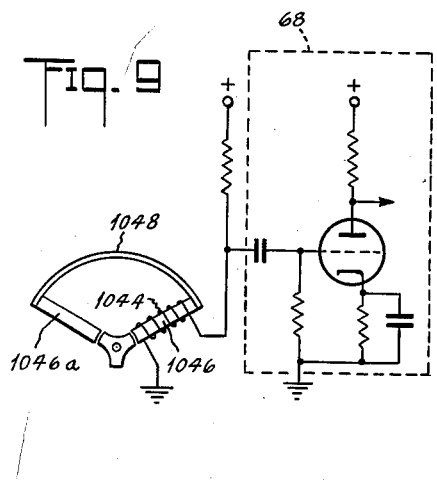

Fig. 9 is a diagrammatic view of an illustrative form of portions of a flow sensing unit, including a coil energized from a source of unidirectional voltage, together with an arrangement for deriving a varying output voltage therefrom.

Figure 10:
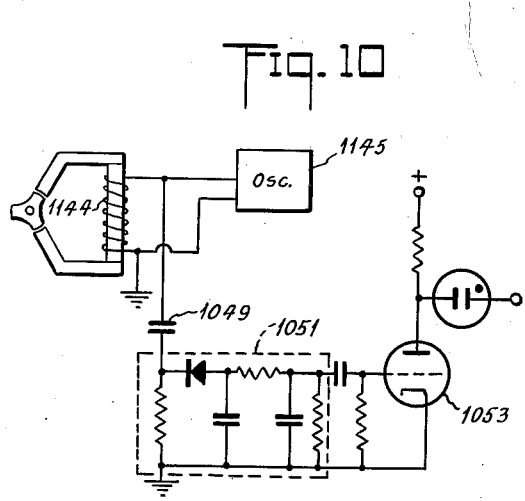

Fig. 10 is a diagrammatic view of another embodiment, illustrating and showing portions of a flow sensing unit, including a coil energized with an alternating carrier voltage, together with an arrangement for deriving therefrom as an output voltage a modulated carrier, and for detecting the modulation envelope.

Figure 11:
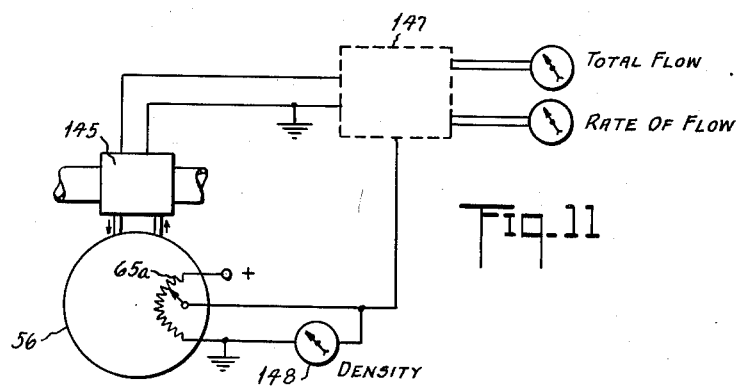

Fig. 11 is a diagrammatic view of a density-compensated system for measuring and computing the flow of fluid through a pipe, in gravimetric units. In the arrangement shown, the density compensating unit varies a potentiometer connected as a voltage divider, in order to apply to the computing system a voltage which compensates for variations in the density of the fluid.

Figs. 12 and 13, taken together, are diagrammatic views, mostly wiring diagrams, of another density-compensated, flow measuring system.

Figs. 14 is a sectional view of apparatus which may be used in the system of Figs. 12 and 13 to measure the density of the fluid, this apparatus being shown schematically in the rectangle formed by dashed lines in the left-hand portion of Fig. 12.

Fig. 15 is a sectional view of the apparatus shown in Fig. 14, along the broken sectional plane 15—15.

Fig. 16 is a fragmentary sectional view of a modified form of the apparatus shown in Figs. 14 and 15.

Fig. 17 is a diagrammatic view showing an arrangement for controlling the apparatus of Fig. 16 and for deriving an output voltage from it.

Fig. 18 is a diagrammatic elevational view, partly in section, and with certain portions broken away, of another form of apparatus for measuring density or specific gravity, this apparatus depending upon certain centrifugal force effects.

Fig. 19 is an elevational view showing a modification of the apparatus of Fig. 18.

Fig. 20 is a diagrammatic view of still another form of apparatus for measuring density or specific gravity, also depending upon centrifugal force.

There will now be described a system adapted to measure the rate of flow of fluid through a pipe, in gravimetric units, for example, pounds per hour, and the total flow, for example, the total number of pounds which have flowed since a given reference moment. The system may use a flow sensing unit of a type shown in Figs. 1 and 2, comprising a bladed rotor installed within the conduit, the axis of the rotor extending lengthwise of the conduit. The rotor is rotated at a rate proportional to the volumetric flow of the fluid through the conduit. The flow sensing unit includes electromagnetic means adapted to generate a series of voltage pulses at a repetition rate proportional to the speed of rotation of its rotor. These voltage pulses are applied to an electronic circuit, for example, to the circuit of Fig. 7 via the leads 55, and the ultimate results are that there are produced indications of the rate of flow on a meter 100 and total flow on a counter 120. In order that these indications may be in gravimetric units, means are provided for continuously measuring the specific gravity or density of the fluid flowing through the flow sensing unit, and compensating the system for variations in the density. To compensate the system of Fig. 7 for variations in the density of the fluid, adjustments are automatically made in the value of the variable resistor or potentiometer 65 by the specific gravity measuring apparatus, which may be of the type shown in Figs. 3–6 or of the type shown in Fig. 8, or of some other type, as will be explained.

Figure 1 shows a short length of conduit or ring 10 which, in the illustrated construction, is of substantially greater diameter than length. This ring or conduit 10 is clamped between pipe fittings 12 by bolts 14. There is a circle of bolts 14 extending through holes in flanges 16 of the pipe fitting 12. The conduit 10 is preferably made of plastic material and sealed against leakage by O-rings 18 located in grooves in the opposite end faces of the conduit 10.

There is a bearing support 20 extending from the inside wall of the conduit 10. This bearing support is connected with the wall at two places, as shown in Fig. 2, and is preferably an integral part of the plastic conduit 10. There is an opening through the bearing support 20 substantially co-axial with the opening through the conduit 10.

A bearing sleeve 22 is carried by the bearing support 20. A shaft 25 rotates in bearings 23 and 23', and there is an armature 26 on the shaft 25. The armature 26 is made of unmagnetized ferromagnetic material, for example, soft iron, or preferably material including iron but protected against rusting or corrosion. For example, it may be made of an alloy of iron, of a non-rusting, non-corroding type. Alternatively, it may be made predominantly of iron but may include a protective outer coating for inhibiting rust and corrosion. The rearward face 27 of the armature serves as a thrust bearing against rearward displacement by contacting, if necessary, with the end face of the bearing 23 or a holder 28 that supports the bearing 23 in the bearing sleeve 22. A shoulder 29 of the shaft 25 serves as a thrust bearing to prevent forward displacements of the armature 26 by contacting, if necessary, with the rearward face of the bearing 23' which is held in a deflector 32.

The deflector 32 has a blunt nose for deflecting a stream of fluid around the sides of the longitudinally extending portion of the bearing support 20. A bleed opening 34 in the deflector 32 permits some fluid to enter the chamber of the deflector in which the bearing 23' is located. The bearing 23' includes a plurality, for example three, fluid-conducting bores extending all the way through it in an axial direction, positioned in line with a portion of the shoulder 29.

These bores also communicate with the bore for the shaft, and the fluid which thus enters the bore for the shaft provides hydraulic support for the shaft. The rear bearing 23 is of similar construction.

As a result of the bores through the front bearing 23' there is a limiting rearward pressure against shoulder 29 to balance a portion of the forward component of pressure exerted against the tail of a rotor 36 which is screwed, or otherwise secured, to the rearward portion of the shaft 25.

The rearward pressure against the shoulder 29 becomes greater, the closer the shoulder approaches to the bearing 23', because it restricts the path of the fluid passing through the aforementioned fluid-conducting bores through the bearing.

The rotor 36 is preferably made of plastic material with metal vanes 38 that have their lower ends molded into the plastic hub of the rotor. Because the forward end of the rotor is located in a region of the conduit of more restricted effective cross section than the regions to either side thereof, and the rear end is in a region slightly downstream therefrom, there is produced a pressure against the rear of the rotor hub with an upstream component of force exerted forwardly in a direction parallel to the longitudinal axis of the shaft 25. The forward component is so proportioned that it substantially balances the rearward or downstream thrust of the flowing fluid against the rotor blades. In one preferred embodiment the upstream component just slightly overbalances the downstream component, and hence moves the rotor upstream, where further motion is prevented by the aforementioned pressure on the shoulder. Alternatively, a ball bearing may be inserted in the cavity in front of the forward end of the shaft, to take the forward thrust, in cooperation with the deflector 32. The arrangement described reduces friction in the bearings of the shaft 25 so that the speed of rotation of the rotor and its connected shaft is substantially proportional to the rate of flow of the fluid without having to make allowance for increased bearing friction with increased rate of flow. The rearward end of the rotor hub is tapered with the length of the taper long enough to provide efficient venturi action but not so long as to create a downstream viscous drag great enough to overcome the upstream component of force.

It may be seen that one of the features of the apparatus which has been described is that there is provided a novel arrangement for suspending a rotor in a conduit so as to minimize frictional resistance. That is, there is provided a fluid-conducting conduit and a bladed rotor therein, journaled for rotation by the advancing fluid about an axis extending axially of the conduit, the conduit and rotor being shaped to provide a restricted region therebetween, so as to produce a venturi effect. Because of the venturi effect, the fluid pressure is less in the restricted region than it is in a region downstream therefrom. The rotor is mounted so that it is free to move somewhat upstream or downstream before striking any restraining members; that is, there is longitudinal play between it and its thrust bearings. The front part of the rotor is located in a region in which the pressure is lower than the pressure in which the rear part of the rotor is located and the result is that, because of the venturi effect and the position of the rotor, there is an upstream component of force against the rear of the rotor, which substantially balances the downstream force of the fluid against the blades and other parts of the rotor. Thus the rotor is freely suspended by the fluid force at an intermediate position where it does not press against its thrust bearings, and is adapted to rotate with very little friction. It is to be understood that while such an arrangement has been illustrated in connection with the sensing element of a flowmeter, it may be used in other applications.

There are two recesses 42 in the plastic wall of the conduit 10 and there are coils of wire 44 housed in these recesses 42. A magnetic core, preferably a permanent bar magnet 46, extends through the coil of wire 44 and through the wall of the conduit and through a portion of the bearing support 20 to a termination in or adjacent to the bearing sleeve 22. When the conduit 10 is made of plastic the coils of wire 44 and the bar magnets 46 are preferably molded in the plastic.

The bar magnet 46, that extends through one of the coils 44, has its north pole located adjacent to the bearing sleeve 22, whereas the other bar magnet has its south pole located adjacent to the bearing sleeve 22. The armature 26, as it rotates past the pole faces of the bar magnets 46, creates a variable air gap between the armature and the pole faces of the bar magnets. This disturbs the flux pattern of the bar magnets 46 and causes a shift in the lines of flux in and around the coils of wire 44, thus generating a voltage in the coils of wire 44.

The flux field of the magnets 46 is completed, across the outer ends of the magnets, by an iron band 48 that contacts with the outer pole faces of the bar magnets 46. In the construction illustrated, this band 48 extends all the way around the periphery of the conduit 10. The angular spacing of the magnets 46 is preferably the same as the angular spacing of the poles of the armature 26, but this is not essential. The iron band 48 fits into a groove in the peripheral face of the conduit 10. There is an outer ornamental cover band 50 over the magnetic iron band 48.

The pipe fittings 12 preferably have internal threads 52. The inside wall of each of the fittings, inward of the threads 52, is shaped with a change in cross section along the length of the fittings in the regions of the deflector 32 and in the region of the tail of the rotor 36. The deflection and variation in the velocity of the fluid stream at the throat of these fittings 12 provide a better control of the fluid pressure against the deflector 32 and the tail piece 36.

The coils of wire 44 are connected together by a conductor 54 and these coils are connected with the electric circuit of the apparatus by wires 55 leading away from the conduit 10. The vanes 36 are shaped so as to extend at an angle to the direction of flow of the fluid through the conduit 10 so that contact of the fluid with the vanes imparts rotary motion to the vanes and rotor. For more efficient operation, the vanes have a curved contour.

The embodiment of the flow sensing unit which has been described includes a rotating armature of ferromagnetic material. The armature is not a magnet. Included in the stator of the flow sensing unit are means providing a magnetomotive force to create magnetic flux, and means forming a magnetic path for the flux and having at least one pole face. The armature rotates past this pole face so as to vary the reluctance of the magnetic path and to vary the flux through it. Also included in the stator is means responsive to the varying magnetic flux through the magnetic path for producing a voltage signal which varies at a rate related to the speed of rotation of the armature.

The sensing unit may, as shown in Figs. 1 and 2, use a permanent magnet in the stator for producing the magnetomotive force. One or more series-connected pickup coils surround the magnet or some other portion of the magnetic path in the stator. The pickup coil need not be energized from any external source of potential, and its output terminals may be coupled, for example, via a couping condenser, to the grid circuit of the succeeding amplifier, such as 68 in Fig. 7.

Another arrangement is shown in Fig. 9. Here the coil 1044 is energized from a source of unidirectional voltage through a load resistor. The pickup coil thus serves a double purpose, in that it provides a magnetomotive force and also serves to generate the output voltage pulses, which are coupled to the succeeding amplifier 68 as shown. The core 1046 on which the coil is wound, the core 1046a, or the iron band 1048, may comprise a permanent magnet, or, since the coil 1044 is energized with direct current, it may supply the sole magnetomotive force in the magnetic circuit.

As shown in Fig. 10, which illustrates still another arrangement, there may be provided a coil 1144 in the magnetic path, and an oscillator 1145 connected to this coil, for applying to it an alternating carrier voltage having a frequency of, for example, 10 kilocycles. In this arrangement, the magnetic path need include no permanent magnet or electromagnet for providing a unidirectional magnetomotive force. As the armature rotates, it varies the reluctance of the magnetic path for the coil, and consequently the magnitude of the voltage appearing across the coil. It may be assumed that the oscillator has a finite output impedance. The output voltage across the coil 1144 will therefore comprise an alternating carrier voltage, amplitude modulated, the modulating envelope having a frequency related to the speed of rotation of the armature. This modulated carrier voltage is applied via a coupling condenser 1049 to a detector 1051, and thence to the grid of a vacuum tube 1053. If the circuit of Fig. 10 is to be employed for driving the system of Fig. 7, the tube 1053 in Fig. 10 would be the same as the tube 73 in Fig. 7. If the circuit of Fig. 10 is to be employed for driving the system of Figs. 12 and 13, the tube 1053 in Fig. 10 would be the same as the tube 164 of Fig. 12.

While the sensing unit has been described in an arrangement for sensing the fluid in a conduit, it may be employed to sense airspeed, or the velocity of various fluids not in a conduit. In such an arrangement, the pipe fittings 12 shown in Fig. 1, and their constricted inner wall, are omitted. The bladed rotor, together with the deflector, the bearing support, and the magnetic path elements, are used as before.

*Density compensator*

Fig. 3 shows apparatus that is combined with the flow sensing unit, and other components of the flowmeter system, for compensating for differences in specific gravity of various fluids which the apparatus may be used to measure. In addition to its usefulness in a flowmeter system, the various forms of specific gravity measuring apparatus to be described may also be used alone, along with a suitable indicator, whenever it is desired to measure the specific gravity of a fluid. In the arrangement to be described, in which the specific gravity measuring apparatus of Figs. 3 and 4 is used as a density compensator for the flowmeter system of Figs. 1, 2 and 7, the apparatus of Figs. 3 and 4 is connected to the conduit in which the flow sensing unit of Figs. 1 and 2 is inserted, so as continuously to receive a sample of fluid representative of that passing through the flow sensing unit. The relationship of the apparatus of Figs. 3 and 4 to that of Fig. 7 is that the potentiometer 65 of Fig. 7 is a part of the density compensator of Figs. 3 and 4, and is controlled in accordance with the density of the fluid being tested, so as to compensate the apparatus of Fig. 7 for variations in density, to enable the output flow readings to be in gravimetric units.

Referring to Fig. 3, the compensator comprises a spherical housing 56 made in two parts which are connected together along a bead 57. This bead is formed by flange portions of the hemispheres of the housing 56 with a packing ring between the flange portions and a clamping ring 58 connecting the flange portions together.

Within the housing 56 there is a casing 59 supported on gimbals 60 that extend inward from the walls of the housing 56. These gimbals are hollow and the passages through them communicate with the interior of the casing 59 in which the compensating mechanism is enclosed. O-rings or other suitable packing are provided between the gimbals 60 and the casing 59 for permitting swinging movement of the casing on the gimbals while at the same time preventing fluid that passes through the gimbals 60 and into the interior of the casing 59 from leaking into the housing 56.

Within the casing 59 there is a float 61 rotatably supported by ball bearings from an axle 62; and there is a counterweight 63 on a support extending substantially radially from the axle 62 on the other side of the axle from the float 61. The center of gravity of the float 61 and the center of gravity of the counterweight 63 lie along radii which are at an angle to one another.

The float is made of low density material, but the material is heavier than any of the liquids with which the apparatus is intended to be used. The counterweight 63, of higher density material than the float, is connected to the float 61 by screws 64 extending through slots in the float 61 to permit adjustment of the angle between the support for the counterweight 63 and the float 61. This angle regulates the sensitivity and stability of the float to changes in the specific gravity of the liquid being measured.

The fact that the center of gravity of the float 61 and the center of gravity of the counterweight 63 are on radii at an angle to one another makes the assembly stable, and the angular position which the assembly assumes depends upon the weight of the float 61 and counterweight 63 with respect to one another. When both the float and the counterweight are immersed in a homogeneous liquid, the effective weight of these two elements is different because of their different volumes. This effective weight difference is compensated by adjusting the counterweight radially along its support so that its lever arm multiplied by its effective weight equals the effective weight of the float multiplied by its lever arm from the axis of the axle 62. The procedure for adjusting this counterweight will be discussed in more detail below.

With this construction a change in the specific gravity of the liquid produces an effective weight change of one element with respect to the other, and therefore a change in the angular position of the float counterweight assembly. It is advantageous to have the volume of the float 61 large in comparison to the volume of the counterweight 63 because the buoyancy of the counterweight subtracts from the positioning force available to move the float.

An example of the effect of the angular adjustment between the float and counterweight may be obtained by considering what would happen if the center of gravity of the float and counterweight were on a straight line extending through the axis of the axle 62. Under such circumstances, any increase or decrease in specific gravity of the liquid would cause the float to rotate until it assumed a vertical position, this being the only position of equilibrium. As the apparatus is adjusted to locate the center of gravity of the float and counterweight on radii that make progressively smaller angles with one another, a given change in the specific gravity of the liquid will produce a smaller movement of the float.

At the back of the casing 59 there is a low torque potentiometer 65 supported in bearings 66 for rotation about an axis in line with the axis of the axle 62. This potentiometer 65 has a weight 65' which holds the potentiometer in a predetermined neutral position with respect to the direction of pull of gravity. Thus if the direction of pull of gravity, instead of being toward the six o'clock position in Fig. 3, were toward the five o'clock position, the weight 65' would also swing over to the five o'clock position, causing a corresponding shift of the potentiometer 65. Because the float 61 and counterweight 63 make a corresponding shift, in order to adjust themselves about the effective direction of the pull of gravity it may be seen that the positions assumed by the float and counterweight relative to that of the potentiometer are not affected by a shift in the effective direction of the pull of gravity.

There are magnetic pins 67 connected to the float-counterweight assembly. In the construction illustrated, the magnetic pins 67 extend rearwardly from the support to which the counterweight 63 is connected. These magnetic pins 67 cooperate with a permanent magnet 68' on the axle of the potentiometer 65 so that rotary movement of the float-counterweight assembly is transmitted to the potentiometer 65 through the magnetic coupling comprising the magnetic pins 67 and permanent magnet 68'. The potentiometer 65 comprises a portion of the system of Fig. 7, and the effect of variations in its setting will be explained subsequently in connection with Fig. 7.

Since the specific gravity compensator is designed for use in airborne units as well as at stationary locations, provision is made for maintaining it in operative position uninfluenced by the direction of gravity pull. For example, the casing 59 is heavier in its lower end than in its upper end, and rotates about the gimbals 60 so as to always locate the casing with its lower end down; and the axis of rotation of the potentiometer and the float-counterweight assembly is at right angles to the axis of the gimbals 60. This makes the float-counterweight assembly and the potentiometer always occupy the same relative positions with respect to one another regardless of the direction of gravity pull on the housing 56 in which the compensator is located. In order to prevent the casing 59 and the potentiometer 65 from swinging too freely, the housing 56 is preferably filled with silicone oil, and there is a filling plug 69 through which oil is poured into the housing.

An illustrative procedure for initially balancing the apparatus is as follows:

Assume, for example, that it is known that the fluid to be measured will have a density which varies through a range extending slightly above and slightly below that of some conveniently available reference fluid of known density, for example, water. In these circumstances, in balancing the apparatus, water would be used as a reference fluid. The casing 59 would be filled with the reference fluid, and with the system including the float 61 and the counterweight 63 immersed in the reference fluid, the operator then would adjust the position of the counterweight radially along its support so that the float 61 and the counterweight 63 take up a position of equilibrium corresponding to that which is required in order that the output of the apparatus may indicate a density corresponding to that of the reference fluid. That is, in case the apparatus of Figs. 3 and 4 is to be used in combination of the system of Fig. 7, a certain setting of the potentiometer 65 is required in order that the density information supplied to the apparatus of Fig. 7 may cause the output readings to correspond to those which are correct when water is flowing through the apparatus. The counterweight 63 is initially adjusted, in the assumed illustration, so that the float and counterweight drive the potentiometer to the above mentioned required setting. After the density compensator has been thus balanced, and connected into the system, if the fluid flowing through the system becomes denser, the float and counterweight as shown in Fig. 3 will move clockwise to a new position, repositioning the potentiometer 65 accordingly. If the fluid becomes lighter, they will move counterclockwise to a new position.

If the apparatus is to measure a range of densities considerably different from that of water, it is preferable to recalibrate the density compensator, using a reference fluid having a density in about the middle of the range to be measured.

Suitable means may be provided, and some are described subsequently, for adjusting by a multiplying factor the calibration of the apparatus controlled by the density compensator.

Fig. 5 shows one way in which the compensator is connected with a line through which liquid is flowing. In order to have the liquid in the compensator the same as the liquid flowing through the pipe line, it is necessary to have some pressure drop across the compensator so that a continuous flow of liquid through the compensator will occur. The pressure drop can be obtained by locating an orifice plate 70 in the pipe line and connecting the hollow gimbals 60 of the compensator with the pipe line on opposite sides of the orifice plate 70.

In another arrangement, the constricted section of the flow sensing unit of Figs. 1 and 2 may serve as an orifice to create a pressure drop, and fluid may be drawn from a point below the deflector 32 in Fig. 1, passed through the density compensator, and returned to the flow sensing unit at a point below the tail of the rotor. One advantage of deriving the fluid for the density compensator from the region of the flow sensing unit is that in the event the density of the fluid changes abruptly, the compensation is more accurate.

Fig. 6 shows another way in which the compensator can be connected to the pipe line in which the fluid is to be measured. In this modified construction there is a Pitot tube 71 facing in a direction against the flow of liquid in the pipe line, the direction of the flow being indicated in Fig. 6 by the arrow. The dynamic pressure of the liquid stream against the open end of the Pitot tube 71 is sufficient to produce a flow of liquid through the compensator so that liquid in the compensator is representative of the liquid flowing through the pipe line.

It would not be desirable to pass all of the liquid through the float casing 59 except for perhaps extreme low rates of flow, as the float should not be affected by flow circulating in the float casing. Instead, the unit is designed to continuously sample the liquid flowing in the main piping. This is accomplished by connecting the unit to both sides of an orifice in the line, as in Fig. 5, or a Pitot tube in the line as in Fig. 6. Ordinary piping losses, in some conditions, may produce enough pressure differential to provide circulation through the compensator.

Fig. 7 shows the apparatus to which the voltage signals from the flow sensing unit of Figs. 1 and 2 are supplied to operate the indicating or recording apparatus of the invention. The voltage impulses from the flow sensing unit are initially supplied to an input amplifier 68 which delivers the amplified signals as pulses of variable amplitude and shape, depending upon the amplitude and shape of the input signal or pulse.

After preliminary amplification in the input amplifier 68, the voltage pulse may have a shape similar to the wave 72 shown in Fig. 7 at the output side of the amplifier 68. This voltage pulse is supplied to the control grid of a high gain, pentode amplifier tube 73, having a resistor 74 in its anode circuit. Although not shown in the drawing, for simplicity, means are provided for applying suitable bias potentials to the intermediate or screen grid, which is biased to a positive potential, and to the top or suppressor grid, which is biased to cathode potential. A neon tube 76 is connected with the anode of the amplifier tube 73 in the circuit with a current limiting resistor 77.

The resistor 77 is connected to the same positive voltage source as the amplifier tube 73. Therefore, when the anode voltage drops to the level where the difference between the voltage source and the anode voltage equals the ionization voltage of the neon tube 76, the neon tube will "strike." Likewise when, in response to a change in the grid voltage, the anode voltage of the tube 73 increases so that the voltage difference is less than the operating voltage of the neon tube, the neon tube will extinguish.

A differentiating network consisting of a condenser 79 and resistor 80 completes the pulse shaper. The shape of the voltage pulse beyond the neon tube 76 is illustrated by the wave 82. By making the time constant of the condenser 79 and resistor 80 circuit small, the differentiated signal has an amplitude very nearly equal to that of the operating voltage of the neon tube, and the wave shape is substantially independent of the shape of the voltage pulse on the anode of the amplifier 73. The steep leading edge of this differentiated signal is due primarily to the fast ionization time of the neon tube 76. Thus there is produced a large amplitude, constant shape and size pulse, independent of the size and form of the signal on the plate of the amplifier tube 73. The reason that the preferred embodiment of the invention uses a pentode for the amplifier tube 73 is that in such a tube the anode voltage is relatively independent of the anode current.

The next stage of the circuit contains a "single pulse," multivibrator 84. This multivibrator consists of two voltage amplifier tubes 86 and 87 connected so that the output of one tube is directly coupled to the grid of the other and vice versa. Normally this arrangement will produce an oscillator having a frequency determined primarily by the time constants of two circuits, one of which includes a condenser 90 and the resistor 80, and the other of which includes a condenser 92 and a resistor comprising the potentiometer 65. However, the illustrated circuit incorporates other resistors 95 and 96 in the circuit to produce a stable state in which the tube 86 is normally conducting and the tube 87 is normally turned off.

The amplification of a negative pulse of proper amplitude and shape instigates one cycle of operation, after which the original stable state is reestablished. The length of time that the tube 86 is turned off and the tube 87 turned on can be adjusted by varying the resistance of the potentiometer 65.

A neon tube 98 is connected to the anode of the normally conducting tube 86 and is also connected to a suitable meter 100 and filter 101. This neon tube remains non-conducting so long as the tube 86 is conducting since the anode voltage of the tube 86 is lower than the "strike" voltage of the neon tube. Therefore, when the single pulse multivibrator 84 goes through one cycle of operation, by application of the proper instigating pulse, the neon tube 98 conducts for a period of time determined by the value of the resistance of the potentiometer 65.

Thus the meter 100 receives power for a definite period of time for each input pulse to the control circuit; and the meter indicates proportionately the average rate of input pulses. The multivibrator 84 is an electronic switch means for supplying power to the meter 100 and other equipment, and the potentiometer 65 comprises an adjustable controller for determining the period during which the electronic switch means remain in conducting condition.

The neon tube 98 initially disconnects the meter from the voltage source in the absence of input pulses and thus provides an absolute "zero" stability.

The same single pulse, multivibrator is used to supply a pulse of controlled length to operate the totalizing circuits. However, in order to insulate the totalizer from the rate section of the circuit, an intervening amplifier is used. This amplifier comprising a tube 103 has its plate connected through a variable resistor 105 to another neon tube 107. Connected between the ground and the neon tube 107 is a condenser 109.

As each input pulse produces one cycle of operation of the multivibrator 84, a pulse is produced at the plate of the tube 103 so that the neon tube 107 conducts during each cycle for a length of time determined by the setting of the potentiometer 65 in the multivibrator circuit. Therefore, a condenser 109 in the circuit with the neon tube 107 is charged by an amount depending upon the length of time that the neon tube is conducting and by the value of the variable resistor 105. Thus the voltage across the plates of the condenser 107 will increase in the steps in accordance with the voltage diagram 110 as successive input signals are supplied to the circuit.

Between the neon tube 107 and the condenser 109, a conductor leads to another neon tube 112, and the other side of the neon tube 112 is connected to a negative voltage supply 115. As shown in the drawing, this negative voltage supply includes a transformer through which alternating current is supplied to the circuit, a rectifier, and a voltage regulator shunted by a condenser connected between the output of the rectifier and the ground. The voltage regulator and its associated condenser serve to regulate or maintain substantially constant the D.C. output voltage. This regulating of the voltage supply is referred to on the drawing by the legend "Neg. Volt. Reg. Supply." The purpose of this connection is to keep the average voltage across the condenser 109 as low as possible and thus minimize the leakage rate of the condenser which results from internal resistance. When the voltage across the condenser 109 builds up to a sufficient value for the condenser 109 to be discharged through the neon tube 112, a negative pulse is supplied through another condenser 117 to a power amplifier 118 which drives a suitable electromagnetic counter 120 of a type operated by voltage pulses.

Since the sensitivity of the rate indicator 100 and the counting ratio of the counter circuit are controlled by the same device, namely the setting of the potentiometer 65, the invention can be used for fluid flow measurement by connecting it to the specific gravity compensator of Fig. 3 in such a way that the movement of the specific gravity indicator changes the setting of the potentiometer 65 by an amount that compensates for the change in specific gravity. The indicator 100 and totalizer 120 thus provide gravimetric or weight indications. Other variable resistors 124 and 105 are provided in the circuit to adjust the counting ratio and meter sensitivity independently of the movement of the potentiometer 65 of the specific gravity compensator. This makes it possible to change the calibration of the meter 100 and of the counter 120 so that each number on the counter or meter can be made to represent a unit of flow such as cubic inches per minute, gallons per hour, or pounds per hour, or kilograms per minute, or other units in which it is desirable to have the measurements made.

*Apparatus of Figure 8*

A variation of the apparatus for measuring specific gravity is shown in Fig. 8. This apparatus employs the same type of housing and casing, as well as gimbal-supporting mechanism, as is shown in Figs. 3 and 4, described heretofore. This outer assembly is omitted from Fig. 8 for clarity of illustration. In Fig. 8 there is shown a float 130 rotatably supported by ball bearings from an axle 131. Connected to the float 130 and extending out in an immediately opposite direction is a support 132 carrying a counterweight 133. It will be understood that the connection between the float and the counterweight is stiff, so that the float and counterweight are parts of a single rigid body, journaled for variable positioning about the axle 131. Unlike the arrangement shown in Fig. 3, it is a feature of the arrangement shown in Fig. 8 that the center of gravity of the float 130 and the center of gravity of the counterweight 133 lie along radii separated by 180°. In Fig. 8 the float is made of low density material which is lighter than any of the liquids with which the apparatus is intended to be used, and the counterweight is made of material considerably denser than the float. The counterweight 133 is held in position on the support 132 by nuts, as shown.

Rotatably carried on the axle 131 is a support 134, which carries at its lower end a weight 135, this weight being internally threaded and adapted to receive the lower threaded end of the support 134. The position of the weight 135 along the threaded support may be adjusted. The weight is held in position by means of a nut 136.

On the float assembly is a projection 140. Extending from the weight 135 is a projection 141. These projections are adapted to receive a spring 142 which is in tension, and which is constantly urging the float assembly, including its counterweight, in a counterclockwise direction as shown in Fig. 8.

The arrangement for deriving an output determined by the position of the float and counterweight is the same as is Fig. 3. That is, the slider of a potentiometer 65 on the outside of the casing 59 and inside of the housing 56 is positioned, with respect to its resistor, through a magnetic drive, 67 and 68' as best shown in Fig. 4.

The procedure for initially balancing the apparatus is as described below.

With the spring removed, and with the assembly of Fig. 8 in air (rather than submerged in a liquid), the position of the counterweight is adjusted until it balances the float. Next, with the assembly of Fig. 8 submerged in a reference liquid, and with the spring 142 attached as shown, the tension of the spring is adjusted until the float and counterweight take up a position of balance which is proper for that reference liquid. That is, a certain setting of the potentiometer will correspond to the density of the reference liquid, and the spring tension is adjusted until the float-counterweight assembly is in such a position as to drive the potentiometer to the aforementioned setting.

Any of a variety of means may be employed to adjust the spring tension. For example, the operator may bend one end of the spring slightly to lengthen or shorten it, or means may be provided for adjusting the position of the projection 141, or the spring may be provided with a turnbuckle or other arrangement for adjusting its effective length and hence its tension.

The apparatus is then in condition for use, and the liquid to be tested is supplied to the interior of the casing 59, instead of the reference liquid. Any difference between the density of the liquid being tested and that of the reference liquid will cause the float-counterweight assembly to change to a new position of equilibrium.

When the apparatus is stationary, or is not being accelerated, the weight 135 will hang approximately downwardly, but is pulled slightly to one side by the effect of the spring. The counterclockwise torque effect of the spring in Fig. 8 balances the clockwise torque effect caused by the differences in the buoyancy effects of the float and counterweight.

Because of the full gimbal system, and because of the effects of the weight 135, the weight 65' for the potentiometer, and the heavy lower end of the casing 59, the output of the system is not affected by changes in orientation of the housing or by accelerations in any direction, since the various weights cause the relative position of the various components (except the housing) to be unaffected.

In the arrangements which have been described, the density compensator, for example, that of Figs. 3 and 4, or that of Fig. 8, has provided density compensation of the flow-measuring system by controlling the potentiometer 65 of the electronic circuit of Fig. 7, which potentiometer also forms a part of the density compensator. Some other flow-measuring systems, for example, that of Figs. 12 and 13, require, for density compensation, a controlled unidirectional voltage related to the density. Fig. 11 illustrates schematically a flow-measuring system in which the density compensator of Figs. 3 and 4, or of Fig. 8, provides such a controlled unidirectional voltage. There is shown in Fig. 11 a flow sensing unit 145, which may be of the type described in connection with Figs. 1 and 2. This flow sensing unit is inserted in a pipe through which is flowing the fluid to be measured. Output voltage pulses from the flow sensing unit 145 are applied to the electronic circuit portion of the system, indicated by the rectangle 147, which in turn applies output voltages to meters which are calibrated to read the rate of flow and the total flow, respectively. A sample of the fluid flowing through the pipe is continuously derived from the flow sensing unit and is supplied to the density compensator, represented schematically by the spherical housing 56. The potentiometer of the density compensator is designated as 65a in Fig. 11. A unidirectional voltage is applied to this potentiometer. The density compensator will position the slider of the potentiometer in accordance with the density of the fluid being tested, and there will therefore appear on the slider a voltage determined by the density. This voltage is applied to the electronic circuit 147, in order to provide density compensation. The manner in which this unidirectional voltage provides density compensation will be understood from the subsequent description of the electronic circuit of Figs. 12 and 13. The circuit shown in the upper half of Fig. 12 and in Fig. 13 may be considered to illustrate the circuit represented by the rectangle 147 in Fig. 11. In the lower half of Fig. 12, there is shown another form of density compensator for supplying a unidirectional voltage for providing density compensation.

As shown in Fig. 11, since the voltage on the slider of the potentiometer 65a is representative of the density of the fluid being tested, this voltage may be applied directly to an indicating meter 148, calibrated to read density, or specific gravity. It will be understood that the apparatus of Figs. 3 and 4, or of Fig. 8, may in this manner be used in combination with an indicating meter to measure specific gravity or density, whenever such measurements are useful, entirely apart from the application of such apparatus to a flow measuring system.

The illustration of the use of the density measuring apparatus with the indicating meter 148 is helpful in understanding the procedure described at an earlier point for initially balancing the apparatus. The apparatus would be balanced so that, with a reference fluid, the reading of the meter 148 would correspond to that of the known specific gravity or density of the reference fluid.

Figs. 12 and 13, taken together, show a system for measuring the rate of flow of fluid through a pipe 150 and indicating the rate of flow on a meter 152 and the total flow on a meter 154, in gravimetric units. The motion of the fluid through the pipe is sensed by a flow sensing unit 156.

The lower half of Fig. 12, taken in connection with Figs. 14 and 15, shows apparatus for measuring continuously the specific gravity of the fluid flowing through the pipe 150, and for indicating the specific gravity on a meter 158. The apparatus also provides an output voltage through a lead 160, to the computing apparatus in the upper half of Fig. 12, which serves to compensate for variations in the density of the fluid, in order that the indications of rate of flow and total flow provided by the meters 152 and 154 may be in gravimetric units.

*System of Figs. 12 and 13 for indicating flow*

The flow sensing unit 156 shown in Fig. 12 provides output voltage pulses in a manner which has been described. It may be of the type shown in Figs. 1 and 2, or of some other type. The wave shape of the pulses will depend upon the exact construction of the sensing unit; the pulses may be more or less sinusoidal, or a distorted sinusoid, or relatively sharp, or relatively square, or some other shape. The frequency or repetition rate of these pulses is proportional to the volumetric rate of flow of the fluid through the pipe 150.

These pulses are applied via leads 158 to an amplifier 160', and thence via a coupling condenser 162 to the control grid 163 of an amplifier tube 164, this grid being biased to cathode potential by a resistor 166. Positive voltage is supplied to the anode 168 from a source terminal 169 through a load resistor 170. Connected between the anode 168 and the grounded cathode 172, is a condenser 174. The point 176 may be seen to be at the potential of the anode 168 and the upper plate of the condenser 174. This point 176 is connected to the left-hand electrode of a cold cathode gas type tube, for example, a neon tube 178, the right-hand electrode of which is connected to a differentiating circuit comprising a series condenser 180 and a grounded shunt resistor 182, the junction point 184 of which is connected to the grid 186 of an amplifier tube 188. The right-hand electrode of the neon tube 178 is biased to ground potential by a resistor 190.

In explaining the operation of the neon tube 178, it may be assumed that this tube is initially in a non-conducting condition, which is true during the more positive (or less negative) portion of the signal applied to the grid 163. As the potential on the grid 163 moves to a less positive or more negative value, the potential on the anode 168 will become more positive. Likewise, there will be an increase in the voltage across the condenser 174, and in the voltage across the neon tube 178. When the potential of the left-hand electrode of the neon tube reaches a high enough positive value so that the voltage across the neon tube reaches its firing voltage, the neon tube will suddenly begin to conduct. At this moment there therefore appears at the point 192 a very steeply rising potential, as the potential at the point 192 rises quickly toward that on the upper plate of the condenser 174. There appears a small additional pip on the leading edge of the pulse at the point 192, because of the difference between the striking and operating voltage characteristic of the neon tube. The shape of the pulse at point 192 is shown immediately above this point. From subsequent description, it will become clear that the system makes use primarily of only the steep leading edge of each pulse. The neon tube 178 will conduct until the potential on the anode 168 falls sufficiently in response to the signal on its grid, so that the voltage across the neon tube is insufficient to sustain conduction.

The values of the circuit components associated with the neon tube 178, including its associated resistors and condensers, are such that a firing voltage will not be impressed across the neon tube 178 again, and it will not conduct again, until it is triggered again by another positive pulse on the anode 168 in response to another pulse from the flow sensing unit 156.

The tube 164 may be regarded as functioning somewhat as a switch tube with respect to the neon tube 178, the switch being in parallel with the neon tube and its series resistor. When the tube is initially conducting, it is as if the switch is initially closed, preventing the voltage across the neon tube from equaling its firing voltage. When the grid of the tube 164 is driven sufficiently negative, it is as if the switch is opened, causing firing of the neon tube, and the consequent production of a steep output pulse across resistor 190. When the grid of the tube 164 goes less negative or more positive, the switch is again closed, extinguishing the neon tube. Instead of using a vacuum tube for a switch means, one may use other switch means, such as a mechanical switch, a transistor, or a magnetic amplifier.

The signal at the point 192 is applied to the differentiating circuit comprising the condenser 180 and the resistor 182. The resulting wave form at the grid 186 of the tube 188 comprises a sharp, positive pulse followed by a small negative tail.

The cathode of the tube 188 is biased to a positive potential by a parallel resistor and condenser combination. Positive voltage is supplied to the anode 196 of the tube 188 through a load resistor 194. The anode 196 is connected via a rectifier 198 and a coupling condenser 200 to the grid 202 of a vacuum tube 204. The tube 204, and a vacuum tube 206, along with their associated resistors and condensers, comprise a uni-stable multi-vibrator or variable-width pulse generator.

The rectifier 198 is connected into the circuit in such a direction that it prevents electron flow from right to left. The right-hand electrode of this rectifier, which has a potential represented by that at the point 208, is biased to a potential which is positive with respect to ground, but which is less positive than the quiescent potential of the left-hand electrode of the rectifier. Thus, the rectifier 198 is normally biased to a non-conducting condition. For biasing the point 208, it is connected via a resistor 210 and a resistor 212 to the positive voltage supply, the junction point 214 of the resistors 210 and 212 being connected to ground via a parallel combination of a resistor 216 and a condenser 218.

The result is that it is only during the more negative portions of the signal applied by the anode 196 to the rectifier 198 that this rectifier conducts, and the more positive portions of the signal are therefore clipped off. Hence, a series of sharp, negative pulses is applied via the coupling condenser 200 to the grid 202.

As was mentioned previously, the tube 204 and the tube 206, with their associated resistors and condensers, comprise a multi-vibrator or variable-width pulse generator. This multi-vibrator is of a type which has only one stable condition, namely, that with the tube 204 in a conducting condition.

For giving the multi-vibrator the desired characteristics, the circuit arrangement is as follows: The grid 202 is connected via a resistor 208a to ground, and via a parallel combination of a resistor 210a and a condenser 212a to the anode of the tube 206. The grid 220 of the tube 206 is connected via a resistor 213 to the lead 160, a condenser 214 being connected between this lead and ground. Grid 220 is also connected via a condenser 215 to the anode of the tube 204. The anodes of the tubes 204 and 206 are connected individually via load resistors to the positive voltage supply. The cathodes are connected together, and are connected to ground via a resistor. The values of the circuit constants are such that the bias voltage normally applied to the grid 202 maintains this tube in a conducting condition when the multi-vibrator is in a quiescent condition. When a negative pulse is applied to the grid of the tube 204, this tube is temporarily cut off and the tube 206 is caused temporarily to conduct. This condition remains for an interval, the duration of which depends upon the circuit constants and upon the value of the unidirectional bias voltage applied via the lead 160 and the resistor 213 to the grid 220 of the tube 206, and the multi-vibrator, in due course, reverts to its original condition, with the tube 202 in a conducting condition and the tube 206 in a non-conducting condition.

The output voltage from the anode 250 of the tube 206 will comprise a square wave with a repetition frequency equal to that of the pulses applied to the grid 202, which in turn is equal to the repetition frequency of the signal from the sensing unit 156. Therefore the repetition frequency of the square wave from the anode 250 is proportional to the volumetric rate of flow of fluid through the pipe 150. The duration "t" of the negative-going portion of the square wave derived from the anode 250 of the tube 206, is determined by the magnitude of the unidirectional voltage applied to the multi-vibrator via the lead 160, from the specific gravity compensating portion of the system.

The result is, therefore, that at the anode 250 there appears a square wave, having a repetition rate proportional to the volumetric rate of flow and having a duration (of the negative-going portions of the wave) proportional to the specific gravity of the fluid. The voltage from the anode 250 is applied via a coupling condenser 252 and a lead 254 to a point 256 in Fig. 13, which shows the rest of the circuit.

From the point 256 the signal is utilized via a first path, including components to be described, terminating in a counter 154 to provide information as to the total flow of the fluid. The signal from the point 256 is also utilized via a second path, including components to be described, terminating in an indicating meter 152, to indicate the rate of flow.

The first of these paths may be considered now.

There is provided a vacuum tube 258 which serves to isolate the multi-vibrator or variable-width pulse generator from those portions of the circuit beyond the tube 258. The cathode of the tube 258 is grounded, and its anode is connected via a resistor 260 to a source 278 of positive potential. There is provided a storage or counting condenser 262 having one plate grounded and its upper plate connected via a cold cathode, gas tube, for example, a neon tube 264 and a variable resistor 266 to the anode 276 of the tube 258. The junction point between the condenser 262 and the neon tube 264 is represented by a point 268. This point is connected via a neon tube 270 to a source 271 of negative potential, for example, minus 50 volts. The point 268 is connected via a coupling condenser and a power amplifier 272 to the counter 154. The counter may be of an electromagnetic-mechanical type, or some other type, adapted to produce an indication related to the cumulative total number of pulses applied to the counter. The operation of this portion of the circuit is as follows:

The condenser 262 may be considered initially in a discharged condition. The tube 258 is normally conducting. The neon tubes 264 and 270 may be considered initially in a non-conducting condition. Upon the appearance of a negative square pulse of duration "$t$" on the grid 274 of the tube 258, cutting off this tube, the potential of its anode 276 rises sufficiently to cause the neon tube 264 to fire and to continue to conduct for the duration of the pulse. As long as the neon tube conducts, that is, for the time interval "$t$," current will flow into the condenser 262 from the positive voltage source at the terminal 278, through the resistor 260, the resistor 266, and the neon tube 264. The amount of charge which will flow into the condenser 262, and hence the voltage rise at point 268, during each pulse, is substantially linearly related to the duration "$t$" of the pulse. This follows from the fact that the amplitude of the pulses applied to the grid 274 is constant, and from the fact that the condenser 262 is always operated over a relatively small and substantially linear portion of its charging characteristic. The voltage on the point 268 will rise in a series of small steps, and so long as the density of the fluid remains constant, the duration "$t$" of the pulses will remain constant, and the small voltage steps at the point 268 will be of equal value. These small voltage steps are so small that they do not individually affect the counter 154. After the reception of a number of pulses, the exact number depending upon their duration and upon the circuit constants, including the setting of the variable resistor 266, the voltage on the condenser 262 will have risen to such a value that the voltage across the neon tube 270 will reach its firing voltage, in view of the fact that there is applied to the lower electrode of this tube a negative potential of, for example, minus 50 volts. When this condition occurs, the neon tube 270 will suddenly fire, causing the condenser 262 to discharge quickly through the neon tube 270 and the point 268 will reach approximately ground potential. The condenser 262 will then be prepared to start charging again in a series of steps in response to the reception of another series of pulses.

When the condenser 262 suddenly discharges through the neon tube 270, it causes a large pulse to be applied through the power amplifier 272 to the counter 154, of sufficient magnitude to actuate the counter. The result is that the number of large pulses applied from the point 268 which actuate the counter 154 in a given time interval is determined by the product of the number of pulses in the output of the sensing unit 156, and the pulse width. Since the number of pulses from the sensing unit in a given time interval is determined by the volume of fluid which flows through the pipe, and since the pulse width is determined by the density of the fluid, the result is that the number of counter-actuating pulses in a given time is proportional to the weight of fluid passing through the pipe. Hence the counter will, if started from a zero reading, read total flow in gravimetric units, for example, pounds.

Rate of flow

That portion of the circuit which indicates the rate of flow will now be described. It is recalled that at the point 256 there is a series of negative, square voltage pulses, the repetition rate of which is proportional to the rate of flow, and the duration "$t$" of which is proportional to the specific gravity. These pulses are applied to the grid 280 of a vacuum tube 282. This grid is normally biased positively by resistors 284 and 286, connected between a source of positive potential and ground, the grid 280 being connected via a resistor 288 to the junction point between the resistors 284 and 286. Because of the positive bias on the grid of the tube 282, this tube will normally be strongly conducting. A relatively low value of load resistor 294 may be used, in order to provide a low impedance path for the neon tube. The potential of the anode 290 will be considerably below the positive voltage of its B-supply source 292 because of the voltage drop across its load resistor 294. The anode 290 is connected via a normally non-conducting tube 296 to one terminal of a condenser 298, the other terminal of which is connected to ground. Connected across the condenser 298 is a resistor 300, having a slider 302. An indicating voltmeter 304 for indicating rate of flow may be connected between the slider 302 and ground. Each time there occurs a negative pulse at the point 256, the tube 282 will be turned off for a period of time corresponding to the duration of the pulse. When this happens, the potential at its anode 290 will rise sufficiently to cause the neon tube 296 to fire. Current will therefore flow from the positive voltage supply terminal 292 through the resistor 294 and the neon tube 296, and into the condenser 298. Since the amplitude of the square voltage pulses is constant, since the frequency of the pulses depends upon the volumetric rate of flow, and since the duration of the individual pulses depends on the density of the fluid, it may be seen that the average current flowing through the neon tube 296, and the indication of the voltmeter 304, will be proportional to the rate of flow in gravimetric units.

Servo

In some cases, it is desirable to make use of a servo in order to provide an indication of rate of flow on a meter 152. In such cases, the voltmeter 304 may also be used, or one may use either the voltmeter 304 or the servo and its associated meter 152. When the servo is to be used, the voltage from the slider 302 is applied via a filter comprising a series resistor 306 and a shunt condenser 308 to a servo 310. There is provided a potentiometer 312 having one end grounded, and the other end connected via a resistor 314 to a source of positive voltage at a terminal 316. There is provided a permanent magnet type D.C. motor 318, which controls the slider 320 of the potentiometer 312 via a shaft 322, and this shaft 322 also drives the indicating pointer 324 of the indicating instrument 152. The action of the servo 310 is such as to maintain the slider 320 at such a position that the positive voltage on the slider, and consequently on the lead 326 connected to this, is equal to the positive voltage applied from the slider 302 via the lead 328 to the servo. It may be seen that the result is that the servo will position the pointer 324 of the indicating instrument 152 at a position determined by the value of the voltage on the lead 328.

The action of the servo may now be described in detail.

The servo includes a "chopper" which serves to provide an output voltage in a lead 330, of an alternating nature, more or less square in wave shape, the amplitude of which is related to the differences, if any, between the voltages on the lead 328 and the lead 326, and the phase of which depends upon the sense of that difference. That is, as compared with the wave shape of the voltage on the lead 330 in a first assumed condition when the potential on the lead 328 is higher than the potential on the lead 326, there will be a reversal in the phase (180° phase shift of the fundamental component) of the output voltage on the lead 330 if the potential on the lead 326 is made higher than the potential on the lead 328.

For accomplishing this, there is provided a double vacuum tube 332, having a first section in which there is an anode 334, a cathode 336, and a control grid 338, and a second section in which there is an anode 340, a cathode 342, and a control grid 344. The anode 340 is connected to the lead 328, via a resistor 346. The anode 334 is connected to the lead 326 via a resistor 348. The anodes 334 and 340 are connected to one another via the potentiometer 350, which has a slider 352, which may be used for balancing the system initially to eliminate effects of differences in the two sections of the tube 332.

There is provided a transformer 354, having a primary winding 356, energized with alternating current from an alternating current source. The transformer 354 has a pair of secondary windings. A first of these secondary windings, 358, is used to energize the grid 344 via a rectifier 360. The grid 344 is connected via a resistor 362 to the cathode 342. The rectifier 360 is oriented so that electrons may flow from the winding 358 through the rectifier 360 toward the grid. The result is that a series of negative half cycles of voltage is applied to the grid 344.

The arrangement for the other section of the tube is similar, and a winding 364 of the transformer 354, together with a rectifier 366 is used to apply a series of negative half cycles of voltage to the grid 338, which is biased to cathode potential by a resistor 368. The windings 358 and 364 are oriented with respect to one another and with respect to the primary 356, so that the voltage appearing across the winding 358 is 180° out of phase with the voltage appearing across the winding 364. The result is that the two sections of the tube 332 alternately receive half-cycles of voltage great enough to carry the grids well below the cutoff voltage. It may be assumed that the negative half-cycles of voltage on the grids are of such large magnitude that the grids are below cut-off for almost the entire half-cycle.

The lead 326 is connected via a parallel variable resistor 372 and condenser 370 to ground. This resistor is used as a linearity control. The slider 352 of the potentiometer 350 is connected via a condenser 374 to the grid of an amplifier tube 376.

Assume for example, that the potential of the lead 328 is more positive than the potential of the lead 326. In this case, the point 378 will be more positive than the point 380, which in turn will be more positive than the point 382, which in turn will be more positive than the point 384. In effect, then, the upper section of the tube 332 will have no effective anode supply voltage, because the anode 340 will be less positive than the cathode 342. The result is, therefore, that there will not be any conduction through this section of the tube. On the other hand, since the point 382 is more positive than the point 384, there is an effective anode supply voltage for the lower section of the tube, which includes the anode 334, the cathode 336 and the grid 338.

It may be seen that, under the assumed conditions of unbalance, namely, that the point 378 is more positive than 384, there will be intermittent conduction from the anode 334 to the cathode 336, the conduction occurring during those intervals when there is no negative pulse being applied to the grid 338. The result of this intermittent conduction is to cause the potential of the anode 334 and that at the point 382 to vary as substantially a symmetrical square wave. The wave has substantially flat tops and bottoms because during substantially the entire half-cycle of voltage in the winding 356, when a negative pulse is applied to the grid 338, the grid is below cut-off, and during substantially the entire other half-cycle, the grid is at cathode potential.

The vacuum tube 376 has its anode connected to a positive voltage supply through a resistor 373. The potential of the anode is represented by a point 377. This point is connected to ground via a large condenser 375. At the operating conditions the condenser 375 presents an impedance to ground for the point 377 which is relatively small compared to the impedance presented by the resistor 373. As a result of the approximately square wave of voltage applied to the grid of the amplifier tube 376, together with the values of the circuit constants, there appears at the point 377 a voltage wave having a shape approximately as indicated on the drawing. The shape of the voltage at this point comprises a series of exponential rises and exponential decays. The exponential rise starts at the moment when the square wave of voltage on the grid of the amplifier 376 moves to a more negative potential, and the exponential decay starts at the moment when the square wave of voltage on the grid of the amplifier 376 changes sharply in a positive going direction. The reason the wave shape which has been described at the point 377 is desirable is that it enables controlling the firing angle of the thyratrons 386 and 388 so that when there is a large condition of unbalance between the voltages at the leads 328 and 326 the thyratron fires through a large angle and when the system approaches balance the thyratron fires through a small angle, the firing angle decreasing successively as balance is approached.

There is provided a pair of power tubes of the gas type, for example, thyratrons, 386 and 388, the tube 386 being provided with an anode 390, a cathode 392 and a control grid 394. The tube 388 is provided with an anode 396, a cathode 398 and a control grid 400. The cathodes 392 and 398 are individually grounded via a resistor 393 and a resistor 399, respectively.

For energizing the anodes of the thyratrons in phase opposition, there is provided a transformer 402 having a primary winding 404 and two secondary windings, 406 and 408. The polarity of the windings 406 and 408 is related so that when the anode 390 is driven in a positive direction, the anode 396 is driven in a negative direction. The primary 404 is energized from the same power supply as is the primary 356.

The thyratrons 386 and 388 are connected to the terminals 414 and 416 of the permanent magnet type D.C. motor 318 as shown, in such a way that when the thyratron 386 conducts, conventional or positive current flows into the terminal 414 and out of the terminal 416, producing rotation of the motor in a first direction. When, on the other hand, the thyratron 388 conducts, current flows through the motor in the opposite direction, producing rotation of the motor in a direction opposite to the first.

The voltage signal from the amplifier 376 at the point 377 is applied via a coupling condenser 409 to a point 410 and thence to the grid 394 via a resistor 412, and to the grid 400 via a resistor 414a. A resistor 416a is connected between the point 410 and a source 417 of about minus 6 volts. This minus voltage biases the grids of the thyratron below their critical firing voltage, under quiescent conditions.

Under the assumed conditions, the thyratron 386 will conduct intermittently, applying voltage pulses to the terminal 414 with respect to the terminal 416, since the phase relationship of the voltage at the point 410 is such that the grids of the thyratrons are driven in a positive direction during the time when the anode 390 is driven positive, but at a time when the anode 396 is driven negative.

The motor 318 will thereupon rotate the slider 320 in a clockwise direction sufficiently far to cause the voltage at the point 384 to equal the voltage at the point 378, slowing down as balance is approached because of the wave shape at the point 410 which has been described. That is, because of the fact that the voltage applied to the grids of the thyratrons instead of being a square wave, slopes upwardly throughout the duration of the half-cycle of voltage applied to the anode 390, the firing angle of the thyratrons is affected by the amplitude of the voltage on their grids. The amplitude of the square wave output of condenser 374 varies as the difference of potential varies between points 378 and 384, the amplitude being zero when these points are of equal potential.

For conditions of large unbalance of the servo, the amplitude of the thyratron grid voltage is greater, and the thyratrons fire earlier and conduct through a larger angle, than for conditions of small unbalance. As the motor rotates to reestablish balance, it will position an indicating pointer 324 of the instrument 152 to indicate a rate of flow in accordance with the voltage at the point 378, which in turn is determined by the density-compensated rate of flow of fluid through the pipe 150, in pounds per hour, or similar gravimetric units.

It will be understood that if the rate of flow through the pipe should decrease, there will correspondingly be a decrease in the voltage at the point 378. Under this condition, the potential at the point 384 will be more positive than that at the point 378. There will then be no conduction through that portion of the tube including the anode 334, but there will be intermittent conduction through that portion of the tube 332 including the anode 340. The result is that during those intervals when there are no negative pulses applied to the grid 344, positive pulses will be applied to the grids of the thyratrons. These positive pulses will occur during the positive pulses applied to the thyratron anode 396, and this will produce current through the motor 318 in a direction to rotate the slider 320 and the pointer 324 in a counter-clockwise direction to a new point of equilibrium, thereby indicating the decreased rate of flow.

*Density measuring apparatus of Figures 12, 14 and 15*

One feature of the density or specific gravity measuring apparatus to be described at this point is that it does not depend upon the force of gravity, and its accuracy is not affected by any variations in the value of gravitational forces or other accelerating forces to which the apparatus may be subjected. This feature is particularly advantageous when the apparatus is being used in aircraft, which may subject it to strong accelerations during the measurements without affecting its performance.

The apparatus includes a hollow member, which may for example, be elongated and of tubular shape, for containing the fluid to be tested. The hollow member is supported and journaled for oscillation about an axis passing transversely through the middle of the hollow member. The hollow member is in dynamic and static balance about this axis. This arrangement is of considerable advantage in giving the apparatus the desirable property of being unaffected by the force of gravity or variations in accelerating forces to which the apparatus may be subjected.

Another feature of one embodiment is that, in addition to the first hollow member which carries the fluid of unknown specific gravity, there is provided another, exactly similar hollow member, for carrying a fluid of known specific gravity. For each hollow member there are means, for example, a spring, providing a force for urging it to return to its equilibrium position when it is deflected about its axis of oscillation, and means, for example, a solenoid, for intermittently applying a deflecting force to it, to cause it to oscillate about that axis. The two hollow members are supported in a common frame. Each hollow member and its assembly for deflecting, restoring and supporting it is identical in construction to the other. Each of the hollow members will oscillate at a frequency determined by the specific gravity of its fluid. By the use of electrical pickup means, there are generated two electrical signals corresponding in frequency respectively to the frequencies of oscillation of the two hollow members. These two electrical signals are beat against one another, to derive a signal the frequency of which is related to the difference in frequency of oscillation of the two hollow members. Indicating means are provided for indicating a value proportional to this difference frequency, which in turn is related to the specific gravity of the fluid being measured. Also, in case this apparatus is being used in connection with a gravimetric flowmeter, there is generated a unidirectional voltage proportional to the previously mentioned difference frequency, and this unidirectional voltage is used to compensate the flowmeter for variations in the density of the fluid.

In Fig. 12, there is shown schematically a specific gravity sensing unit 502, including a first hollow member or tube assembly 504, for containing the fluid to be measured, and a second hollow member or tube assembly 506, for containing a fluid the specific gravity of which is known. Fluid from the pipe 150 is supplied to the tube assembly 504 through a conduit 508 and is returned to the pipe 150 through a conduit 510. It will be understood that means within the pipe 150 provide sufficient pressure drop between the point where the conduit 508 meets the pipe 150 and the point where the conduit 510 meets the pipe 150, to assure that the fluid in the tube assembly 504 is a representative sample of the fluid passing through the pipe 150.

It will be understood also that the specific gravity measuring apparatus to be described in connection with the lower half of Fig. 12 and Figs. 14 and 15 may be used to measure the specific gravity of fluids in applications other than in connection with a flowmeter. That is, it is believed that the method and apparatus for measuring specific gravity described herein is novel per se, and its use is not to be regarded as limited to the combination of it with other apparatus and methods described herein.

The general purpose of the apparatus shown in the lower half of Fig. 12, in this illustrative embodiment, is to provide on the meter 158 an indication of the specific gravity of the fluid flowing through the pipe 150, and to provide in the lead 160 a unidirectional voltage proportional to this specific gravity. It will be recalled that the voltage in the lead 160 is used to determine the duration of the negative square pulses generated by the multivibrator comprising the tubes 204 and 206.

Turning now to Figs. 14 and 15, the structure of the specific gravity sensing apparatus will be described.

The tube assembly 504 is shown toward the bottom of Fig. 14 and also in Fig. 15, and the tube assembly of 506 is shown toward the top of Fig. 14.

There is provided a lower base 512, an upper base 514, and a circular housing 516, screwed together, and provided with rubber O-rings 518, for sealing purposes.

It may be observed generally that the assembly associated with the tube assembly 504, in the lower half of Fig. 14 is identical with the assembly associated with the tube assembly 506 in the upper half thereof. The two assemblies are mounted so that the tube assembly 506 runs perpendicular to the major plane in which the tube assembly 504 lies, this being the plane of the paper in Fig. 14.

There are provided a pair of mounting rails 520 and 522. These rails carry coil mounting plates 524 and 526 which in turn carry coils 528 and 530, held in place by lock nuts 532 and 534. The coils are provided with cores of ferro-magnetic material, 536 and 538. The coil 530 terminates in leads 540 and 542. The coil 528 terminates in leads 544 and 546. The various electrical leads are brought in through a connector 548.

The tube assembly 504 comprises an inner feed tube 550, an outer measuring tube 552, a supply and torsion tube 554 communicating with the inner feed tube and a discharge and torsion tube 556, which communicates with the measuring tube. There is provided a hub 558 which serves several purposes. It aids in supporting the feed tube 550 and the measuring tube 552 with respect to each other and with respect to the torsion tubes 554 and 556. It is shaped to include a duct 560, providing communication between the interior of the measuring tube 552 and the discharge torsion tube 556. Carried by the rails 520 and 522 are pair of wire springs 562 and 564. In the upper half of Fig. 14 a similar arrangement is shown, and because of the orientation, may be seen clearer. The springs for the upper part of Fig. 14 are 566 and 568. The hub 558 has portions which include bores for receiving the springs 562 and 564. The tube assembly 504 in Fig. 14 may be seen to be mounted for oscillation in the plane of the paper, and the springs 562 and 564 serve to provide a restoring force when they are bent by the hub 558, which occurs when the tube assembly is deflected about its axis of oscillation established by the torsion tubes 554 and 556. Soldered to the measuring tube 552, toward its lefthand end, in a position to cooperate with the coil 530, is an armature 570. A similar armature 572 is carried by the righthand end of the tube 552, in a position to cooperate with the coil 528. The coil 528 is a driving coil, which serves intermittently to attract the armature 572 and hence to transmit a driving force to the tube assembly 504, for producing oscillatory motion of it. The coil 530 is a pickup coil, and in response to motion of the armature 570 by the measuring tube 552, there are produced variations in the reluctance of the magnetic circuit for this coil. One or more counterweights, for example, solder, are applied to each oscillating tube assembly, of sufficient magnitude and at proper points to balance the assembly about its axis of oscillation. Such a counterweight is shown in Fig. 14 at 573. The balance should be sufficiently good to assure that, under conditions of acceleration to which the apparatus will be subjected including linear accelerations, vibrations, and other accelerations, the output signal from the pickup coil will not be affected enough to give a significantly erroneous indication. For this purpose it is usually sufficient to provide static balance. In addition, it is desirable to provide dynamic balance. Such conditions of balance are attained by the application of counterweights, such as solder.

Aside from the use of counterweights to provide balance, they are also used to tune the tube assemblies, that is to adjust each one to a desired natural resonant frequency, and to give the two assemblies, 504 and 506, identical characteristics in this respect. As shown in Fig. 12, the coil 530 is energized from a source 574 of positive unidirectional potential, through a resistor 576, and a resistor 578, connected to ground. At a point 580 at the upper end of the resistor 578 there will appear a unidirectional component of potential, because of the biasing effect of the current from the source 574. In addition, because of the variations in the reluctance of the magnetic circuit of the coil 530, and the consequent variations in the inductance of this coil, there will appear at the point 580 an alternating component of potential having a repetition frequency the same as the frequency of oscillation of the tube assembly 504.

The driving coil 528 is connected in the anode circuit of a vacuum tube 582, which is energized from a source 584 of unidirectional voltage. The tube 582 includes an anode 586, a control grid 588 and a cathode 590, the cathode being connected to ground. The grid 588 is biased to the cathode potential by a resistor 592, and is connected via a coupling condenser 594 to the point 580. It may be seen that the amplifier tube 582, the oscillating tube assembly 504 and the connections thereto comprise an electro-mechanical oscillator. That is, variations in the anode current of the tube 582 will produce variations in the position of the tube assembly 504, because of the solenoid action of the coil 528, and oscillatory motion of the tube assembly 504 will produce variations in the current through the pickup coil 530, and consequently variations in the voltage applied to the grid 588 of the tube 582. Such a system will have a natural resonant frequency which depends upon a number of factors. One of the factors upon which it depends is the restoring force supplied by the stiffness of the torsion tubes 554 and 556, and the stiffness of the springs 562 and 564. One of the principles upon which the operation of the apparatus depends is that the natural frequency of oscillation depends also upon the mass of the oscillating mechanical components, and this in turn depends largely upon the specific gravity of the fluid being measured. The walls of the oscillating tube assembly are made thin so that the mass of the fluid will be the major portion of the total oscillating mass.

It will therefore be seen that the current through the amplifier tube 582 will vary at a frequency determined by the specific gravity of the fluid passing through the pipe 150.

A fluid of known specific gravity, in one embodiment of the invention, is placed in the vibrating tube assembly 506. The conduits 596 and 598 which communicate with the oscillating tube assembly 506 are then sealed. The oscillating tube assembly 506 and its associated circuits are exactly like the oscillating tube assembly 504 and its associated circuits. The tube assembly 506 is oscillated by a coil 600 and applies a signal to a pickup coil 602, the coils having armatures affixed to the tube assembly. The coil 600 is connected in the anode circuit of a vacuum tube 604 having an anode 606, a cathode 608 and a grid 610. The pickup coil 602 is energized from a source 612 of unidirectional potential, through a resistor 613, and is connected in series with a resistor 614, the bottom end of which is connected to ground. A point 616 at the top end of the resistor 614 is connected via condenser 618 to the grid 610, which is biased to ground by a resistor 620. The voltage at the anode 606 will vary at a constant frequency determined by the known specific gravity of the reference fluid in the tube 506.

There is provided a network, including a resistor 622 and a resistor 624 connected in series between the anode 586 and the anode 606. The resistors 622 and 624 are of the same value. The midpoint 626 of these resistors will have a varying signal proportional to the sum of the varying signals at the anodes 586 and 606.

The sum signal from the point 626 is applied via a coupling condenser 628 across a resistor 630, and appears at a point 632, at the top of this resistor. From this point the signal is applied to a rectifier 634, oriented in such a direction as to allow electrons to pass only from left to right. The righthand electrode of this rectifier is coupled to ground via a condenser 636. A point 638 connected to the upper plate of this condenser is connected to a filter comprising the condenser 636, series resistors 640 and 642 and shunt condensers 644 and 646. In parallel with the condenser 646 is a resistor 648, which in conjunction with the resistors 640 and 642 comprises the ground return for the rectifier 634 and the point 638. The frequency component of the voltage at the point 650 would, except for the filter, include not only the frequencies at which the tubes 504 and 506 oscillate, but also their sum and difference frequencies. The filter is of such circuit constants as to reject the relatively high frequencies of oscillation of the tubes 504 and 506, and their sum frequency, but to pass the difference frequency. The upper end of the resistor 648 is identified as a point 650.

There is provided a vacuum tube 652 having an anode 654, a cathode 656 and a control grid 658. The anode circuit is energized from a source 660 of positive potential, through a resistor 662. Connected in parallel with the resistor 662 is the series combination of a resistor 664 and a cold cathode gas tube, for example, a neon tube 666. The junction point between the resistor 664 and the neon tube may be designated as 668. The grid 658 is biased to cathode potential by a resistor 670, and is coupled to the point 650 by a coupling condenser 672.

The point 668 is coupled to an amplifier 674 by a coupling condenser 676, and a shunt resistor 678 in the input circuit of the amplifier.

In its quiescent condition, the neon tube 666 is in a nonconducting condition. The point 668 is at the positive potential of the supply terminal 660. There will be some current through the tube 652, but not so much as to lower the anode 654 sufficiently so that the voltage across the neon tube 666 is great enough to initiate conduction.

It will be recalled that the voltage at the point 650 varies at a frequency equal to the difference in the frequencies of oscillation of the oscillating tubes 504 and 506. This voltage at the point 650 is more or less sinusoidal in nature. When this voltage makes an excursion in a positive direction, the voltage of the grid 658 will, in due course, rise sufficiently so that the current through the tube 652 increases enough to cause the potential at the anode 654 to drop to a value sufficiently low that the voltage across the neon tube 666 exceeds its firing voltage. When this occurs, the neon tube 666 will suddenly begin to conduct. When the neon tube suddenly begins to conduct, the voltage at the point 668 will suddenly drop. In due course, as the potential on the grid 658 becomes sufficiently negative, and as the anode potential consequently becomes more positive, the voltage across the neon tube will become small enough so that conduction of the neon tube is extinguished, and when this occurs, the potential at the point 668 will again rise suddenly toward the potential of the supply terminal 660. It will therefore be seen that at the point 668 there will appear a periodic negative voltage pulse having a repetition rate equal to the frequency of the voltage at the point 650, which in turn is equal to the difference in the frequencies of oscillation of the oscillating tube assemblies 504 and 506. The periodic voltage at the point 668 will have a steep leading edge.

In one manner of explaining the operation of the neon tube 666 and the tube 652, one may regard the tube 652 as a switch tube in series with a voltage source, and a parallel circuit; the parallel circuit comprises the series-connected resistor 664 and the neon tube 666, on the one hand, in parallel with the resistor 662. When the grid of the tube is sufficiently negative, it is as if the switch is open. The neon tube does not then conduct. When the grid of the tube 652 is driven sufficiently positive (or less negative), it is as if the switch is closed, lowering the potential of the bottom electrode of the neon tube sufficiently to fire the neon tube and produce across the resistor 664 a pulse with a steep leading edge, which edge is substantially independent in shape and amplitude, of the shape of the pulse which controls the switch tube 652.

The output pulse from the point 668 is amplified and inverted by the amplifier 674, and is then differentiated by a differentiating circuit including a series condenser 680 and a shunt resistor 682. The lower end of the resistor 682 is connected to a terminal 684 at which there is a source of negative potential, for example, of about minus 150 volts. The point between the resistor 682 and the condenser 680 may be designated as 686. At this point there will occur a series of sharp pulses, with a steep positive-going leading edge (corresponding to the firing of the neon tube 666), and having a repetition frequency equal to the difference frequency previously mentioned.

There is provided a single-shot multivibrator comprising a double vacuum tube 688 having a first section including an anode 690, a cathode 693 and a control grid 694, and a second section including an anode 696, a cathode 698 and a control grid 700. The cathodes are connected together and are connected via a resistor 702 to the source 684 of negative voltage. The anodes are respectively connected individually via resistors 704 and 706 to ground. The grid 694 is coupled via a condenser 708 to the anode 696.

The anode 690 is coupled to the grid 700 via a resistor 710 and a resistor 712, the lower end of the resistor 712 being connected to the negative terminal 684, and the intermediate point 714 between the resistors being connected to the grid 700.

A rectifier 716 is connected between the grid 694 and the negative terminals 684, and oriented so that electrons may pass from the grid toward this negative terminal, but not in the reverse direction.

The operation of the multivibrator circuit is such that in its quiescent condition the lefthand section of the tube 688 is in a nonconducting condition and the righthand section of the tube is in a conducting condition. Upon the occurrence of a positive pulse, the lefthand section is triggered into a conducting condition, and the righthand section into a nonconducting condition. This situation prevails for a predetermined period of time, fixed in value, determined by the values of the circuit constants. At the end of this predetermined period of time, the multivibrator will automatically return to its original quiescent condition. The result is that there is derived from the anode 690, at an output point 718, a series of negative-going square pulses of constant width, having a repetition rate equal to the difference in the frequencies of oscillation of the tubes 504 and 506.

Connected to the point 718 is one electrode of a neon tube 720, having its other electrode connected to ground via the parallel combination of a resistor 722 and a condenser 724. The neon tube 720 is normally in a nonconducting condition, but upon the occurrence of a negative pulse from the point 718, it fires, and continues to conduct for the duration of the negative pulse. It may therefore be seen that current flows from ground toward the point 718 through the neon tube 720, charging the condenser 724 negatively during each pulse. The total charge flowing in a given interval of time, or in other words, the average current flowing, will be proportional to the repetition rate of the pulses at the point 718, and consequently proportional to the difference in the oscillation frequencies of the oscillating tubes 504 and 506.

The charge in the condenser 724 is allowed to bleed off through a resistor 722. A voltmeter 158 connected across the resistor 722 will read a voltage determined by the difference in the oscillation frequencies of the oscillating tubes 504 and 506. Since this difference frequency is related to the specific gravity of the fluid in the tube 504, the voltmeter 158 may be calibrated to read specific gravity.

In case it is desired to use the specific gravity information in order to compensate flow measuring apparatus for variations in the density of the fluid being measured, the voltage from the upper plate of the condenser 724, that is, from a point 726, may be passed through a filter comprising a series resistor 728 and a shunt condenser 730, in order to remove any ripple. Connected across the condenser 730 is a potentiometer 732, having a slider 734. There will appear at the slider 734 a unidirectional voltage related to the specific gravity of the fluid being measured. For calibration purposes, the slider 734 may be adjusted to a position to give this unidirectional voltage a proper multiplication factor. The resulting voltage, appearing in the lead 160, is applied to the multivibrator comprising the tubes 204 and 206 in a manner which has been described, in order to determine the width of the square pulses derived from the last-mentioned multivibrator.

*Density measuring apparatus—Modification in Figs. 16 and 17*

Another arrangement for driving the oscillating tube assembly is illustrated in Figs. 16 and 17. As shown in Fig. 17, there is provided a vacuum tube 750 which serves somewhat the same function as the tube 582 in Fig. 12. A coil 752 is connected in the anode circuit of the vacuum tube, and when there is a large current through the vacuum tube, the coil 752 attracts an armature 754 carried by the measuring tube 756. The measuring tube 756, together with its inlet and discharge torsion tubes for providing a restoring force, is of the same construction as the previously described measuring tubes of Figs. 14 and 15, such as 552, the only difference being in the driving arrangement. Restoring springs similar to 562 and 564 may be used, in addition to the restoring means provided by the torsion tubes, but are not shown in Fig. 16, for simplicity. The control grid 758 of the vacuum tube 750 is normally biased via a resistor 760 to a negative potential derived from a terminal 762, sufficiently negative to prevent conduction through the tube 750, or to reduce the current to a value so small that the coil 752 is unable to overcome the restoring force provided by the torsion tubes and springs. The control grid is also connected with a contact 764, which is positioned to be engaged and disengaged by a contact 766 carried by the tube 756 as it oscillates. The contact 766 is grounded through the tube 756 and its frame. The contact 764, as shown in Fig. 16, is adapted to yield somewhat when the advancing contact 766 engages it and continues to advance for a short distance. For this purpose, the contact 764 is of spring construction and also its lefthand end as shown in Fig. 16 may lift up somewhat and pivot about its righthand end when the apparatus is in a quiescent condition, that is, when the coil 752 is not energized, the spring force of the torsion tubes and the springs serves to position the assembly so that the contact 766 is in engagement with the contact 764.

The operation of the apparatus, as may best be understood from Fig. 17, is that, when the circuit is energized, since the grid is connected to ground or cathode potential via the contacts 764 and 766, the vacuum tube 750 conducts strongly, and the resulting current through the coil 752 attracts the armature 754 and thereby moves the measuring tube 756 far enough to cause the contact 766 to disengage the contact 764. When this happens, the potential of the grid drops to its negative bias potential, reducing the current through the coil, and allowing the measuring tube to be restored by the spring force to its original position, and the cycle is thus repeated, causing the measuring tube to oscillate at a frequency determined by the density of the fluid in it. The output signal may be derived from the anode of the vacuum tube 750 and used as described in connection with tubes 582 and 604 of Fig. 12. The driving arrangement of Figs. 16 and 17 may be used for both measuring tubes of a double tube arrangement like that shown in Fig. 14. It will be understood that the tube assemblies of Figs. 16 and 17 are counterbalanced for static and in some cases dynamic balance about their axis of oscillation, by means of counterweights.

There will now be described certain embodiments of density measuring apparatus in which a continuous rotary or orbital movement is given to a hollow body filled with the material to be tested, or to a portion of such a body. This motion produces a centrifugal force, the magnitude of which depends upon the density of the material within the hollow body, and the apparatus makes use of this centrifugal force effect.

One such embodiment will be described, first in general terms, and then specifically in connection with Figs. 18 and 19.

*Density measuring apparatus of Figs. 18 and 19*

In one embodiment of the density or specific gravity measuring apparatus, a hollow body, comprising two hollow balls rigidly attached to the ends of a stiff tube, is journaled and balanced about a first axis passing transversely between the balls and intersecting the tube perpendicularly, midway between the balls. The hollow body is free to move about this axis to varying positions against the force of a restraining spring, which urges the stiff tube toward the second axis. The hollow body is in addition continuously rotated by an electric motor about a second axis which is perpendicular to the first. Such rotation produces centrifugal force tending to urge the hollow balls away from the second axis, and this centrifugal force tends to urge the hollow body as a whole to assume a position transverse to the second axis. Means are provided for deriving information related to the centrifugal force. For example, there are provided electrical contacts in series with the power supply of the electric motor, and the contacts are arranged to be responsive to the position of the hollow body, so that when the centrifugal force effect is small, the motor is energized, and when the centrifugal force effect is large, the motor is de-energized. In this manner the system will tend to rotate at an average speed required to overcome the effect of the spring sufficiently to maintain the hollow body at such a position with respect to the second axis that the contacts barely are engaged, or chatter. If the density of the material in the hollow body is low, a high speed of rotation will be required to maintain the hollow body at such a position. If the density is higher, a lower speed will be required. With the aid of an electromagnetic pickup, there are derived electrical pulses having a repetition rate proportional to the speed of rotation and hence proportional to density. These pulses may be applied to frequency-responsive apparatus to produce an indication of density, or may be employed as in Fig. 12 to produce a voltage for compensating a flow measuring system for density variations.

An example of such specific gravity measuring apparatus is shown in Fig. 18. There is provided a hollow body 780, comprising a pair of hollow spherical members or balls 782 and 784, connected by a stiff hollow tube 786.

The cavities within the balls are interconnected by a relatively small tube 788, which allows fluid to pass from the ball 782 into the ball 784.

There is provided a stiff, hollow, spindle tube 790, which supports and gives rotary movement to the member 780. Journal means are provided for supporting the hollow body 780 on the spindle tube 790, so that the hollow body 780 may adjust in position in the plane of the paper in Fig. 18, about an axis halfway between the balls 782 and 784, this axis being perpendicular to the paper in Fig. 18. Such journal means comprise short sleevelike members indicated at 792, affixed to the hollow body 780 and to the spindle tube 790. Fluid, the specific gravity of which is to be measured, passes upwardly in a small tube 794 within the spindle tube 790, thence through the journal means 792 via a flexible connecting tube, thence via a small tube 796 within the tube 786 into the ball 782, filling this ball. Fluid from the ball 782 passes through the previously mentioned small tube 788 within the tube 786, into the ball 784, filling this ball. Fluid passes from the ball 784 through a small tube 798 within the tube 786 to the journal means 792, through this journal means via a flexible tube, and downwardly through a small tube 800 within the spindle tube 790.

The spindle tube 790 is journaled for rotation in a block 802, having bushings 804, 806 and 808. Between the bushing 804 and the bushing 806, the spindle tube 790 is shaped to form an annulus 810. Fluid enters the apparatus via conduit 812, which extends through the block 802 and communicates with the annulus 810. The tube 794 also communicates with this annulus, and in this manner fluid from the conduit 812 is fed into the tube 794.

In like manner, there is provided an annulus 814 between the bushings 806 and 808. The tube 800 communicates with this annulus, as does a discharge conduit 816. In this manner fluid leaves the apparatus through the tube 800, the annulus 814, and the conduit 816.

The spindle tube 790 is driven via a shaft 818 from a motor 820. The spindle 790 preferably includes an offset near its upper end adapted to cause the axis of rotation to pass through the axis of the tube 786.

Carried by the hollow tube 786 is a first contact 822, and carried by the hollow spindle 790 is a second contact 824, positioned to cooperate with the contact 822, and to engage it when the hollow body 780 moves sufficiently far in a clockwise direction, as shown in Fig. 18.

Spring means are provided for urging the hollow body 780 in a clockwise direction. Such spring means are schematically illustrated as a spring 826, affixed to the spindle tube 790 and to the righthand portion of the tube 786.

Carried by the lower end of the spindle tube 790 is a bar magnet 828. There is provided a pickup coil 830, positioned to receive electrical impulses and to produce them at its output terminals 832, in response to rotation of the apparatus, at a repetition rate related to the speed of rotation.

The motor 820 is, for example, of a direct-current type. The contact 822 is grounded through the metallic portions of the hollow body 780 and spindle tube 790 and is thereby connected to a grounded terminal 834 of the motor. The contact 824 is insulated from the spindle tube 790. Connected to the contact 824 via its spring support is a contact 837 positioned on the axis of rotation of the spindle tube. There is provided a stationary contact member, not shown, also on this axis of rotation, for continuously making contact with the contact 837. The terminal 836 of the motor is connected to one terminal of a battery, the other terminal of which is connected to the contact 824 via the aforementioned contact 837 and its cooperating stationary contact.

From the previous general description, the operation of the apparatus of Fig. 18 will be understood. The system will rotate at an average speed so that centrifugal force causes the contacts 822 and 824 to be barely engaged, or to chatter. The average speed of rotation will be indicative of the density of the material in the hollow body, and this speed may be measured by measurement of the frequency of the pulses appearing at terminals 832.

A modified arrangement is shown in Fig. 19. In this arrangement the cavities within the balls 840 and 842 are connected by a hollow rigid tube 844. Fluid is supplied to ball 840 via a looped conduit 846, and fluid leaves the ball 842 by a looped conduit 848. The conduits 846 and 848 provide the restoring spring action similar to that provided by the spring 826 in Fig. 18. It will be understood that the looped conduits 846 and 848 enter the spindle tube 850 at a lower point.

Fig. 20 shows still another arrangement for measuring specific gravity. This apparatus makes use of a measuring tube assembly like that shown in Figs. 14 and 15, for example, tube assembly 504. An end view of such a tube is shown in Fig. 20, the tube being represented by the numeral 856. In Fig. 20 the tube 856 is driven in a manner quite different from the manner in which the tube assemblies are driven in Fig. 12. It will be understood that the tube 856 is, however, supported by torsion tubes in exactly the same manner as was the tube assembly of Fig. 12. In Fig. 20, there is applied to one end of the tube 856 a force adapted to give it an orbital motion. For this purpose, there are provided three coils, 858, 862 and 864, oriented 120 degrees apart physically, these coils being connected together in a star or delta arrangement, the latter being shown in Fig. 20. A three-phase current is supplied to these coils through the leads 866, from a source 867. The tube 856 may be assumed to be of ferromagnetic material, adapted to be influenced by the magnetic field supplied by the three coils. The tube may have a tough outer plastic coating. Surrounding the tube 856 is a cylinder 868, for example, of plastic, which does not shield the tube 856 from the magnetic field of the coils. The coils are mounted symmetrically with respect to the cylinder 868, but the tube 856 is in a slightly off-center position. The rotating magnetic field will translate the end of the tube 856 around an orbital path, that is, will give angular movement to the end of the tube, causing the tube to pivot about its midpoint. The resulting centrifugal force effect will, as the angular speed increases, tend to cause the end of the tube to be displaced outwardly from the axis of the cylinder 868, against the restoring force of the torsion tubes. This restoring force will act toward the axis of the cylinder 868. The outward displacement mentioned will continue until the tube 856 engages the cylinder 868, which produces a braking effect, limiting the speed. The ultimate angular speed will be larger when the tube 856 is filled with a light fluid, than when it is filled with a heavy fluid. This is because a heavy fluid will, at a slower speed, produce a great enough centrifugal force to overcome the restoring force of the spring means provided by the torsion tubes, while a lighter fluid will require a greater speed to do so.

To derive an output signal, a permanent magnet is attached to the opposite end of the tube 856, and a pickup coil arranged in a position to receive the varying flux from the magnet as it is moved about an orbital path. The output signal will have a frequency determined by the density of the fluid, and may be used in the same way as has been described heretofore in connection with similar signals, to produce an indication of density.

The apparatus of Fig. 18 or Fig. 20 may be of the dual type, in which one apparatus includes a fluid to be tested and one an unknown fluid. The resulting output signals will be compared in frequency as shown in Fig. 12.

It will be understood that any of the specific gravity measuring apparatus described herein may be used as the density compensator for the flowmeter system described herein.

The apparatus shown in the upper half of Fig. 12 and in Fig. 13 may be used as a frequency meter by applying the signal to be measured to the leads 158.

While a suitable form of apparatus and method, to be used in accordance with the invention, and certain modifications, have been described, it will be understood that numerous changes may be made without departing from the general principles and scope of the invention.

I claim:
1. Apparatus for measuring fluid flow in gravimetric units, comprising rotary means in a conduit containing a flowing fluid, whereby said rotary means is rotated by said fluid at a rate related to the volumetric rate of flow of said fluid, electromagnetic means actuated by said rotary means for generating a series of electrical pulses repeated at a frequency related to said volumetric rate of flow, means actuated by said pulses for generating a series of square pulses of constant amplitude and at said repetition rate, means for sensing the specific gravity of said fluid, said square pulse generator including means responsive to said specific-gravity-sensing means, for varying the duration of said individual square pulses, whereby to produce square pulses having a repetition rate related to said rate of flow and a duration related to said specific gravity, and integrating means responsive to said square pulses for indicating said rate of flow in gravimetric units.

2. Apparatus for measuring fluid flow in gravimetric units, comprising rotary means in a conduit containing a flowing fluid, whereby said rotary means is rotated by said fluid at a rate related to the volumetric rate of flow of said fluid, electromagnetic means actuated by said rotary means for generating a series of electrical pulses repeated at a frequency related to said volumetric rate of flow, a variable width pulse generator having a first input terminal for receiving said electrical pulses and a second input terminal for receiving a control voltage and adapted to generate a series of square pulses of constant amplitude at the repetition rate of said pulses applied to said first terminal and having a variable width determined by said control voltage applied to said second input terminal, means for sensing the specific gravity of said fluid, means responsive to said specific gravity sensing means for generating a control voltage and applying same to said second input terminal, whereby to produce square pulses having a repetition rate related to said volumetric rate of flow and a duration related to said specific gravity, and integrating means responsive to said square pulses for indicating said rate of flow in gravimetric units.

3. Apparatus for measuring fluid flow in gravimetric units, comprising a multi-vibrator having a single condition of stability, means responsive to the volumetric rate of said fluid flow for triggering said multi-vibrator and thereby causing it to generate square-topped voltage pulses at a repetition rate related to said volumetric rate of fluid flow, a movable hollow member for receiving a sample of said fluid, means repeatedly advancing said movable member along a predetermined path at a rate related to the specific gravity of said fluid, means responsive to the repetition rate of the motion of said hollow body for generating electrical pulses having a repetition rate related to said specific gravity, means responsive to the repetition rate of said last-mentioned pulses for generating a variable unidirectional voltage, means applying said variable unidirectional voltage to said multi-vibrator for controlling the duration of its individual output pulses, and means responsive to both the repetition rate and the duration of the output pulses from said multi-vibrator for indicating the rate of flow of said fluid in gravimetric units.

4. Apparatus for measuring fluid flow through a conduit in gravimetric units, comprising rotary means in said conduit rotated by said fluid at a rate related to the volumetric rate of flow of said fluid, electromagnetic means actuated by said rotary means for generating a series of electrical pulses repeated at a frequency related to said volumetric rate of flow, a variable-width pulse generator actuated by said pulses for generating a series of square pulses of constant amplitude and at said repetition rate, means for generating an electrical signal having a repetition frequency determined by the specific gravity of said fluid, said means including a hollow, movable element for receiving said fluid and means for driving said element periodically through a closed path at a cyclical rate determined by the specific gravity of said fluid, means for sensing the known specific gravity of a reference fluid and for generating an electrical signal having a repetition frequency determined thereby, means for heterodyning said signals to produce an output signal including frequency components, means including reactance elements for selecting one of said frequency components, means responsive to the selected one of said frequency components for generating a unidirectional control voltage, means applying said control voltage to said variable width pulse generator to control the width of its output pulses, whereby to produce square-topped pulses having a repetition rate related to said rate of flow and a duration related to said specific gravity, and integrating means responsive to said square-topped pulses for indicating said rate of flow in gravimetric units.

5. In combination, sensing means responsive to the rate of flow of a fluid, electric pulse generating means actuated by said sensing means for generating a series of square pulses of constant amplitude but variable duration at a frequency determined by said rate of flow, said pulse generating means including a control element for varying the shape of said individual pulses by varying their duration, integrating means responsive to said electric pulses for indicating the flow of said fluid, means for sensing the specific gravity of said fluid, and means responsive to said specific-gravity-sensing means connected to said control element for varying the duration of said individual pulses to compensate said indicating means for variations in said specific gravity.

6. Flow measuring apparatus comprising, in combination, means responsive to the flow of a fluid for generating electrical pulses having a repetition frequency proportional to said flow, an electrically operated measuring device, circuit means connected to receive said pulses and including a pulse converter for producing output pulses having predetermined characteristics substantailly independent of the shape and amplitudes of said first-mentioned pulses, electronic switch means operated by said output pulses and connected to actuate said measuring device to produce indications of said fluid flow, said electronic switch means having a conducting and a non-conducting condition and including a control for determining the period during which it remains in a conducting condition, means for sensing the specific gravity of said flowing fluid, and means responsive to said specific gravity sensing means for operating said control to compensate the indications of said device for variations in said specific gravity.

7. Apparatus for measuring both rate of flow and total flow of a fluid comprising, in combination, means responsive to the flow of a fluid for generating electrical pulses having a repetition frequency proportional to said flow, a pulse converter connected to said first means for receiving pulses therefrom and operable through a cycle to produce an output pulse of predetermined shape and amplitude in response to each pulse from said first means, a meter responsive to pulses to indicate rate of flow, an electromagnetic counter responsive to pulses to indicate total flow, a common pulse controller connected to the output of said pulse converter and to the input of said meter and counter, for producing pulses to operate said meter and counter, said pulse controller including a control for changing the duration of said last-mentioned pulses, and a specific gravity compensator for sensing the specific gravity of said fluid and operating said control, whereby to produce on said meter and said counter indications of flow of said fluid, compensated for variations in specific gravity of said fluid.

8. Apparatus as in claim 7 including, in the input circuits of said meter and counter, adjustable controls for changing the calibrations of said meter and counter independently of each other and independently of said control operated by said specific gravity compensator.

9. In combination, means responsive to the flow of a fluid for generating voltage pulses having a frequency proportional to said flow, a controlled square wave pulse generator, means connected to said first means for triggering said controlled square wave pulse generator at a rate proportional to the frequency of said pulses from said flow sensing means, an indicating device, an input circuit for said indicating device connected between it and said square wave pulse generator, comprising a condenser and a charging circuit for said condenser including a cold cathode gas discharge tube, said tube being connected to be fired by successive ones of said square wave pulses, for successively applying quantities of charge to said condenser, said input circuit being connected to actuate said indicating device in response to the voltage on said condenser, to indicate a quantity having a definite relation to said flow of said fluid, said controlled square wave pulse generator including a control element for determining the shape of its output pulses and a specific gravity compensator for sensing the specific gravity of said fluid, said compensator being connected to control said control element for varying the shape of said output pulses, to compensate said indicating device for variations in the specific gravity of said fluid.

10. In a flowmeter, a movable member located in a conduit through which fluid flows and movable in response to fluid flow in said conduit, pulse-generating means including a controlled multi-vibrator circuit having a single condition of stability, means including said movable member for triggering said multi-vibrator to cause it to generate a series of square pulses of constant amplitude and at a repetitive rate determined by the rate of motion of said member, said pulse-generating means including a control element for varying the duration of each individual pulse as the pulses follow one another at said repetitive rate, an output device, means connected between said multi-vibrator and said output device for actuating said output device in accordance with the frequency and an integrated duration of the individual square pulses, and means for sensing the specific gravity of the fluid, said control means being responsive to said last-mentioned sensing means for varying the duration of said individual pulses to compensate the response of said output device for variations in the specific gravity.

References Cited in the file of this patent

UNITED STATES PATENTS

| | | |
|---|---|---|
| 1,305,803 | Irwin | June 3, 1919 |
| 2,031,852 | Poillot | Feb. 25, 1936 |
| 2,221,943 | Fischer | Nov. 19, 1940 |
| 2,299,406 | Potter | Oct. 20, 1942 |
| 2,332,807 | Moore | Oct. 26, 1943 |
| 2,377,605 | Binckley | June 5, 1945 |
| 2,529,481 | Brewer | Nov. 14, 1950 |
| 2,574,432 | Brown | Nov. 6, 1951 |
| 2,575,759 | Higinbotham et al. | Nov. 20, 1951 |
| 2,615,328 | Dolza | Oct. 28, 1952 |
| 2,619,593 | Malter | Nov. 25, 1952 |
| 2,623,389 | Van Oosterom | Dec. 30, 1952 |
| 2,632,326 | Stuart | Mar. 24, 1953 |
| 2,635,462 | Poole | Apr. 21, 1953 |
| 2,637,010 | Charske | Apr. 28, 1953 |
| 2,656,499 | Goodwin | Oct. 20, 1953 |
| 2,657,348 | Jarvis | Oct. 27, 1953 |
| 2,664,742 | MacDonald | Jan. 5, 1954 |
| 2,676,249 | Crosman | Apr. 20, 1954 |
| 2,715,832 | McCollom et al. | Aug. 23, 1955 |
| 2,767,580 | Bevins | Oct. 23, 1956 |
| 2,767,582 | Bartelink | Oct. 23, 1956 |
| 2,772,567 | Boden | Dec. 4, 1956 |
| 2,783,648 | Stovall et al. | Mar. 5, 1957 |